United States Patent
McCanne et al.

(10) Patent No.: US 9,930,099 B2
(45) Date of Patent: Mar. 27, 2018

(54) HYBRID SEGMENT-ORIENTED FILE SERVER AND WAN ACCELERATOR

(75) Inventors: Steven McCanne, Berkeley, CA (US);
Nitin Parab, Menlo Park, CA (US);
John Martin, Menlo Park, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 681 days.

(21) Appl. No.: 12/117,629

(22) Filed: May 8, 2008

(65) Prior Publication Data

US 2008/0281908 A1   Nov. 13, 2008

Related U.S. Application Data

(60) Provisional application No. 60/916,733, filed on May 8, 2007.

(51) Int. Cl.
| | |
|---|---|
| *G06F 15/16* | (2006.01) |
| *G06F 7/00* | (2006.01) |
| *H04L 29/08* | (2006.01) |
| *G06F 21/62* | (2013.01) |
| *G06F 17/30* | (2006.01) |
| *G06F 11/14* | (2006.01) |

(52) U.S. Cl.
CPC ........ *H04L 67/06* (2013.01); *G06F 17/30132* (2013.01); *G06F 17/30156* (2013.01); *G06F 11/1471* (2013.01); *G06F 17/30* (2013.01); *G06F 17/30067* (2013.01); *G06F 17/30091* (2013.01); *G06F 21/6218* (2013.01)

(58) Field of Classification Search
CPC ........... G06F 17/3015; G06F 17/30091; G06F 17/30156; G06F 11/1471; G06F 21/6218; G06F 17/30067; G06F 17/30; H04L 67/06; H04L 67/10

USPC .................................. 709/203, 219; 707/698
See application file for complete search history.

(56) References Cited

U.S. PATENT DOCUMENTS

| | | |
|---|---|---|
| 5,371,852 A | 12/1994 | Attanasio et al. |
| 5,442,771 A | 8/1995 | Filepp et al. |

(Continued)

OTHER PUBLICATIONS

Fay Chang, Jeffrey Dean, Sanjay Ghemawat, Wilson C. Hsieh, Deborah A. Wallach, Mike Burrows, Tushar Chandra, Andrew Fikes, and Robert E. Gruber. 2008. Bigtable: A Distributed Storage System for Structured Data. ACM Trans. Comput. Syst. 26, 2, Article 4 (Jun. 2008), 26 pages.*

(Continued)

*Primary Examiner* — Taylor Elfervig
(74) *Attorney, Agent, or Firm* — Park, Vaughan, Fleming & Dowler LLP; Laxman Sahasrabuddhe

(57) ABSTRACT

In a network including WAN accelerators and segment-oriented file servers, a method comprises responding to a client request to manipulate a file via a network file protocol by receiving a first request at a first WAN accelerator, wherein the request is a request to open a file located at a file server that is a segment-oriented file server, sending a local request for the file, corresponding to the first request, from the WAN accelerator to the file server, using a segment-aware network request protocol, returning at least a portion of the requested file in the form of a representation of a data map corresponding to the at least a portion of the requested file stored on the file server and using a data map for reconstruction of the requested file.

9 Claims, 17 Drawing Sheets

(56) References Cited

U.S. PATENT DOCUMENTS

| | | | |
|---|---|---|---|
| 5,644,751 | A | 7/1997 | Burnett |
| 5,740,362 | A | 4/1998 | Buickel et al. |
| 5,754,774 | A | 5/1998 | Bittinger et al. |
| 5,859,971 | A | 1/1999 | Bittinger et al. |
| 5,878,213 | A | 3/1999 | Bittinger et al. |
| 6,076,084 | A | 6/2000 | Harlan |
| 6,401,103 | B1 | 6/2002 | Ho et al. |
| 6,438,652 | B1 | 8/2002 | Jordan et al. |
| 6,449,688 | B1* | 9/2002 | Peters ............... G06F 11/1076 348/E5.008 |
| 6,571,259 | B1* | 5/2003 | Zheng ............... G06F 17/30067 |
| 6,587,921 | B2 | 7/2003 | Chiu et al. |
| 6,704,730 | B2 | 3/2004 | Moulton et al. |
| 6,775,743 | B2 | 8/2004 | Patel |
| 6,832,297 | B2 | 12/2004 | Pfister et al. |
| 6,912,645 | B2 | 6/2005 | Dautartas et al. |
| 6,981,105 | B2 | 12/2005 | Bourne et al. |
| 7,065,619 | B1 | 6/2006 | Zhu et al. |
| 7,120,666 | B2 | 10/2006 | McCanne et al. |
| 7,318,100 | B2 | 1/2008 | Demmer et al. |
| 8,001,096 | B2* | 8/2011 | Farber et al. ............... 707/698 |
| 2004/0088376 | A1* | 5/2004 | McCanne et al. ............ 709/219 |
| 2004/0174276 | A1* | 9/2004 | McCanne et al. .............. 341/50 |
| 2004/0215746 | A1 | 10/2004 | McCanne et al. |
| 2006/0069885 | A1* | 3/2006 | Matsui ............... G06F 11/1435 711/154 |
| 2007/0038853 | A1 | 2/2007 | Stuart et al. |
| 2007/0266037 | A1* | 11/2007 | Terry ................... G06F 3/0607 |
| 2008/0005274 | A1 | 1/2008 | Subbanna et al. |
| 2008/0077366 | A1* | 3/2008 | Neuse ............... G06Q 30/0283 703/2 |
| 2010/0058054 | A1* | 3/2010 | Irvine ........................ 713/165 |

OTHER PUBLICATIONS

Garth A. Gibson et al. 1997. File server scaling with network-attached secure disks. In Proceedings of the 1997 ACM SIGMETRICS international conference on Measurement and modeling of computer systems (SIGMETRICS '97), Scott Leutenegger (Ed.). ACM, New York, NY, USA, 272-284.*

Adya et al., "FARSITE: Federated, Available, and Reliable Storage for an Incompletely Trusted Environment," *5th Symposium on Operating Systems Design and Implementation*, Dec. 2002, 14 pages, Boston, Massachusetts, USA.

Amer et al., "File Access Prediction with Adjustable Accuracy," *Proceesings of the Performance, Computing, and Communications Conference 2002 on 21st IEEE International*, 2002, pp. 131-140, IEEE Computer Society, Washington D.C., USA.

Annapureddy et al., "Shark: Scaling File Servers via Cooperative Chacing," *Proceesings of the 2nd Conference on Symposium on Newtorked Systems Design and Implementation*, 2005, pp. 129-142, vol. 2.

Black et al., "pNFS Block/Volume Layout," NFSv4 Working Group: Internet Draft; EMC Corporation, Aug. 30, 2006, 18 pages, at URL=http://www.ietf.org/inernet-drafts/draft-ietf-nfsv4-pnfs-block-01.txt, printed Oct. 30, 2006.

Braam et al., "Removing Bottlenecks in Distributed Filesystems: Coda & Intermezzo as examples,"*Proceedings of the 5th Annual Linux Expo*, May 1999, pp. 131-139, Raleigh, North Carolina, USA.

Brewer E., "Toward Robust Distributed Systems," *Invited Talk at Principles of Distributed Computing*, Jul. 2000, 12 pages, Portland, Oregon, USA.

Cox et al., "Pastiche: Marking Backup Cheap and Easy," *Proceedings of the 5th Symposium on Operating Systems Design and Implementation*, Dec. 9-11, 2002, USENIX Association, Boston, Massachusetts, USA.

Dabek et al., "Wide-area Cooperative Storage with CFS," *ACM SIGOPS Operating Systems Review*; Oct. 21-24, 2001, pp. 202-215, vol. 35, Issue 5, Banff, Canada.

Eaton et al., "Efficiently Binding Data to Owners in Distributed Content-Addressable Storage Systems," *Proceedings of the 3rd IEEE International Security in Storage Workshop*, 2005, pp. 40-51, IEEE Computer Society, Washington, D.C., USA.

Eaton et al., "Improving Bandwidth Efficiency of Peer-to-Peer Storage," *Proceedings of the 4th International Conference on Peer-to-Peer Computing*, Aug. 2004, 10 pages.

Ernst et al., "dCache, a Distributed Storage Data Caching System," *Proceedings of Computing in High Energy Physics*, Sep. 2001, 4 pages, Beijing, People's Republic of China.

Factor et al., "Compression in the Presence of Shared Data," *International Journal of Computing and Information Sciences*, Jun. 2001, pp. 29-41, vol. 135, Issue 1-2, NH Elsevier.

Feiertag et al., "The Multics Input/Output System," *Third ACM Symposium on Operating System Principles*, Oct. 1971, pp. 35-41, ACM New York, New York, USA.

Fuhrmann, P., "dCache the Commodity Cache," *Twelfth NASA Goddard and First IEEE Conference on Mass Storage Systems and Technologies*, 2004, 5 pages, Washington D.C., USA.

Gibson. et al., "A Case for Network-Attached Secure Disks," Sep. 26, 2006, 19 pages, CMU-CS-96-142, Carnegie Mellon University.

Gilbert et al., "Brewer's Conjecture and the Feasibility of Consistent, Available, Partition-tolerant Web Services," *ACM SIGACT News*, Jun. 2002, pp. 51-19, vol. 33, Issue 2, ACM New York, New York, USA.

Gray et al., "Leases: An Efficient Fault-Tolerant Mechanism for Distribute File Cache Consistency," *Proceedings of the 12th ACM Symposium on Operating Systems Principles*, 1989, pp. 202-210, ACM New York, NY, USA.

Griffoen et al., "Automatic Prefetching in a WAN," *Proceedings of the IEEE Workshop on Advances in Parallel and Distributed Systems*, Oct. 1993, pp. 8-12, Technical Report # CS243-93.

Griffoen et al., "Reducing File System Latency using a Predictive Approach," *Proceedings of the 1994 Summer USENIX Conference*, Jun. 1994, 12 pages, Technical Report #C5247-94, USENIX Association, Berkeley, CA, USA.

Halevy et al., "Object Based pNFS Operations," NFSv4 Working Group: Internet Draft; EMC Corporation, Aug. 29, 2006, 23 pages, at URL=http://www.ietf.org/inernet-drafts/draft-ietf-nfsv4-pnfs-block-02.txt, printed Oct. 30, 2006.

Hildebrand et al., "pNFS and Linus, Working Towards a Heterogeneous Future," *CITI Technical Report 06-06*, May 10, 2006, 5 pages, Center for Information Technology Integration, University of Michigan, Ann Arbor, Michigan, USA.

Howard, J., "An Overview of the Andrew File System," *Proceedings of the USENIX Winter Technical Conference*, Feb. 1988, 6 pages, CMU-ITC-88-062, Carnegie Mellon University.

Howard et al., "Scale and Performance in a Distributed File System," *ACM Transactions on Computer Systems*, Feb. 1988, pp. 51-81, vol. 6, Issue 1.

Kubiatowicz et al., "OceanStore: An Architecture for Global-Scale Persistent Storage," *Proceesings of the Ninth International Conference on Architectural Support for Programming Languages and Operating Systems*, Nov. 2000, pp. 190-201, vol. 34, Issue 5, Association for Computing Machinery, New York, New York, USA.

Kroeger et al., "The Case for Efficient File Access Pattern Modeling," *Proceedings of the Seventh Workshop on Hot Topics in Operating Systems*, Mar. 1999, pp. 14-19, IEEE Computer Society Washington, DC, USA.

McKusick et al., "A Fast File System for BSD," *ACM Transactions on Computer Systems*, Aug. 1984, pp. 181-197, vol. 2, Issue 3.

Kulkarni et al., "Redundancy Elimination Within Large Collections of Files," *Proceedings of the General Track: 2004 USENIX Annual Technical Conference*, Jun. 27-Jul. 2, 2004, 15 pages, University of Massachusetts, Boston, Massachusetts, USA.

Lei et al., "An Analytical Approach to File Prefetching," *1997 USENIX Annual Technical Conference*, Jan. 1997, 12 pages, Anaheim, California, USA.

Muthitacharoen et al., "A Low-bandwidth Network File System," *Proceedings of the 18th ACM Symposium on Operating System Principles*, Oct. 21-24, 2001, pp. 174-187, ACM New York, New York, USA.

(56) References Cited

OTHER PUBLICATIONS

Muthitacharoen, A. et al., "Ivy: A Read/Write Peer-To-Peer File System," *ACM SIGOPS Operating System Review*, Dec. 2002, pp. 31-44, vol. 36, Issue SI.

Nelson et al., "Caching in the Sprite Network File System," *ACM Transactions on Computer Systems*, Feb. 1988, pp. 134-154, vol. 6, Issue 1.

Padmanabhan et al., "Using Predictive Prefetching to Improve World Wide Web Latency," *ACM SIGCOMM Computer Communication Review*, Jul. 1996, pp. 22-36.vol. 26, Issue 3.

Rand, D., "The PPP Compression Control Protocol (CCP)," *Network Working Group*, Jun. 1996, 9 pages, at URL= http://www.ietf.org/rfc/rfc1962.txt, printed Jan. 29, 2009.

Rhea et al., "Pond: the OceanStore Prototype," *Proceedings of the 2nd USENIX Conference on File Storage Technologies*, Jan. 2003, 14 pages.

Rhea et al., "Value-Based Web Catching," *Proceedings of the 12th International World Wide Web Conference*, May 2003, pp. 619-628, ACM New York, New York, USA.

Rosenblum et al., "The Design and Implementation of a Log-structured File System," *Proceedings of the 13th ACM Symposium on Operating Systems Principles*, 1992 (Jul. 24, 1991), 15 pages, vol. 10, Issue 1.

Sandberg et al., "Design and Implementation of the Sun Network File System," *Proceedings of the Summer 1985 USENIX Conference*, Jun. 1985, pp. 119-130.

Shepler et al., "Network File System (NFS) version 4 Protocol," *Network Working Group*, Apr. 2003, 257 pages, at URL= http://www.ietf.org/rfc/rfc3530.txt, printed Jan. 29, 2009.

Spring et al., "A Protocol-Independant Technique for Eliminating Redundant Network Traffic," *Proceedings of ACM SIGCOMM*, 2000, 9 pages Tolia et al., "Integrating Portable and Distributed Storage," *Proceedings of the 3rd USENIX Conference on File and Storage Technologies*, Mar. 2004, pp. 227-238, San Francisco, California, USA.

Tolia et al., "Opportunistic Use of Content Addressable Storage for Distributed File Systems"; *Proceedinge USENIX Annual Technical Conference, General Track*, Jun. 2003, pp. 127-140, San Antonio, Texas, USA.

Tolia et al., "An Architecture of Internet Data Transfer," *Proceedings of the 3rd Symposium on Networked System Design and Implementation*, May 2006, 14 pages, San Jose, California, USA.

Zhu et al., "Avoiding the Disk Bottleneck in the Data Domain Deduplication File System," *Proceedings of the 6th USENIX Conference on File and Storage Technologies*, 2008 pp. 269-282, USENIX Association.

\* cited by examiner

Hierachical Labels
organized as a Data Map

/ D1 / D2 / F1 ⟶ ⟨ L1, L2, L3 ⟩

/ D1 / D2 / F2 ⟶ ⟨ L12, L7, L8, L9 ⟩

/ D1 / F3 ⟶ ⟨ L27, L3 ⟩

/ D1 / F4 ⟶ ⟨ L26, L7, L12, ... ⟩

/. segstore ⟶ contents of segment mappings

*Fig. 8*

*Fig. 11*: Simultaneous WAN and LAN access

HYBRID SEGMENT-ORIENTED FILE SERVER AND WAN ACCELERATOR

CROSS-REFERENCE TO RELATED APPLICATIONS

This application claims benefit under 35 USC § 119(e) of U.S. Provisional Patent Application No. 60/916,733 filed May 8, 2007, which is herein incorporated by reference in its entirety for all purposes.

The present disclosure may refer to one or more of the following commonly assigned applications/patents:

U.S. Pat. No. 7,120,666 entitled "Transaction Accelerator for Client-Server Communication Systems" (hereinafter "McCanne I");

U.S. Pat. No. 6,667,700 entitled "Content-Based Segmentation Scheme for Data Compression in Storage and Transmission Including Hierarchical Segment Representation" (hereinafter "McCanne II");

U.S. Patent Publication 2004/0215746, published Oct. 28, 2004 entitled "Transparent Client-Server Transaction Accelerator" (hereinafter "McCanne III");

U.S. Pat. No. 7,318,100 entitled "Cooperative Proxy Auto-Discovery and Connection Interception" (hereinafter "Demmer I");

U.S. Patent Publication 2008/0005274, published Jan. 3, 2008 entitled "Throttling of Predictive ACKs in an Accelerated Network Communication System" (hereinafter "Subbanna I");

U.S. Patent Publication No. 2007/0038853, published Feb. 15, 2007 entitled "Split Termination for Secure Communication Protocols" (hereinafter "Day I");

The respective disclosures of these applications/patents are incorporated herein by reference in their entirety for all purposes.

FIELD OF THE INVENTION

The present invention relates generally to file system access optimized for constrained bandwidth and/or high-latency network paths, and more particularly to network file data manipulations over a constrained network path and storage and management of data using file servers in the file system to improve storage efficiency and compactness relative to prior approaches.

BACKGROUND OF THE INVENTION

File system access often needs to be optimized for constrained bandwidth and/or high-latency network paths. Transaction accelerators are known, such as those described in McCanne I.

Originally called a transaction accelerator in McCanne I and McCanne III, devices that perform transaction acceleration have subsequently been called by various other terms including, but not limited to, WAN accelerators, WAN optimizers, WAN optimization controllers (WOCs), wide-area data services (WDS) appliances, WAN traffic optimizers (WTOs) and so forth. In recent times, transaction acceleration has also been referred to by the alternate names: transaction pipelining, protocol pipelining, request prediction, application flow acceleration, protocol acceleration, and so forth. Herein, the term "WAN accelerator" is used to refer to such devices.

Recently, the industry has adopted the term "data deduplication" to refer to some processes of eliminating redundant data for the purposes of storage or communication. For example, storage products have been introduced where a storage target for backup software performs data deduplication to reduce the amount of storage required for backup that exhibit high degrees of redundancy, as described in McCanne II. Likewise, network systems, e.g., as described in McCanne I, McCanne II and McCanne III, have been introduced that perform data deduplication (among other functions) to reduce the amount of bandwidth required to transmit data along a network path.

WAN accelerators perform a set of optimizations with the goal of making the performance of a networked application running over a wide-area network (WAN) as close as possible to the performance it would obtain running over a local-area network (LAN). LAN communication is characterized by generous bandwidths, low latencies and considerable enterprise control over the network. By contrast, WANs often have lower bandwidths and higher latencies than LANs, and often provide limited controls to the enterprise IT operator because WAN links often traverse networks that are tightly controlled by a service provider thereby preventing the enterprise IT operator from modifying or introducing components within the closed, service-provider network.

Wide-area client-server applications are a critical part of almost any large enterprise. A WAN might be used to provide access to widely used and critical infrastructure, such as file servers, mail servers and networked storage. This access most often has very poor throughput when compared to the performance across a LAN.

There is considerable literature on the general problem and proposed solutions, such as the literature listed here:

[Amer02] Amer. et al., "*File Access Prediction with Adjustable Accuracy*", In Proc. of the International Performance Conference on Computers and Communication, April 2002.

[Brewer00] E. Brewer, "*Toward Robust Distributed Systems*", Invited talk at Principles of Distributed Computing, Portland, Oreg. July 2000.

[Feiertag71] Feiertag and Organick, "*The Multics Input/Output System*", Third ACM Symposium on Operating System Principles, October 1971.

[Gilbert02] S. Gilbert and N. Lynch, "*Brewer's Conjecture and the Feasibility of Consistent, Available, Partition-Tolerant Web Services*", SigAct News, June 2002.

[Griffioen94] Griffioen and Appleton, "*Reducing File System Latency Using a Predictive Approach*", In Proc. of the 1994 Summer USENIX Conference, June 1994.

[Howard88] Howard, "*An Overview of the Andrew File System*", In Proc. of the USENIX Winter Technical Conference, February 1988.

[Kroeger99] Kroeger and Long, "*The Case for Efficient File Access Pattern Modeling*", In Proc. of the Seventh Workshop on Hot Topics in Operating Systems, March 1999.

[LBFS] A. Muthitacharoen, B. Chen, and D. Mazieres, "*A Low-bandwidth Network File System*", in Proceedings of the 18th ACM Symposium on Operating Systems Principles (SOSP '01), pp. 174-187 (Chateau Lake Louise, Banff, Canada, October 2001) (in vol. 35, 5 of ACM SIGOPS Operating Systems Review, ACM Press).

[Lei97] Lei and Duchamp, "*An Analytical Approach to File Prefetching*", In Proc. of the 1997 Annual USENIX Conference, January 1997.

[McKusick84] McKusick, et al., "*A Fast File System for BSD*", ACM Transactions on Computer Systems, Vol. 2(3), 1984.

[Nelson 88] Nelson, Welch, and Ousterhout, "*Caching in the Sprite Network File System*", ACM Transactions on Computer Systems, 6(1), February, 1988.

[NFS] R. Sandberg, D. Goldberg, S. Kleiman, D. Walsh, and B. Lyon, "*Design and Implementation of the Sun Network File System*", In Proceedings of the Summer 1985 USENIX Conference, 1985.

[NFSv4] "NFSv4 Minor Version 1", Internet Draft, draft-ietf-nfsv4-minorversion1-02.txt.

[Padmanabhan96] Padmanabhan and Mogul, "*Using Predictive Prefetching to Improve World Wide Web Latency*", ACM SIGCOMM, Computer Communication Review 26(3), July 1996.

[Rand96] D. Rand, "The PPP Compression Control Protocol (CCP)", Request-for-Comments 1962, June 1996.

[Rosenblum92] Rosenblum and Ousterhout, "*The Design and Implementation of a Log-Structured File System*", ACM Transactions on Computer Systems, Vol. 10(1), 1992.

[Sandberg85] Sandberg et al., "*Design and Implementation of the Sun Network Filesystem*", In Proc. of the Summer 1985 USENIX Conference, 1985.

[Spring00] Spring, N., et al., "*A Protocol-Independent Technique for Eliminating Redundant Network Traffic*", in Proceedings of ACM SIGCOMM (August 2000).

[Tolia03] N. Tolia, M. Kozuch, M. Satyanarayanan, B. Karp, T. Bressoud, and A. Errig, "*Opportunistic Use of Content Addressable Storage for Distributed File Systems*", Proceedings of USENIX 2003.

Many applications and systems that operate well over high-speed connections need to be adapted to run on slower speed connections. For example, operating a file system over a LAN works well, but often files need to be accessed where a high-speed path, such as over a LAN, is not available along the entire path from the client needing access to the file and the file server serving the file. Similar design problems exist for other network services, such as e-mail services, Web services, computational services, multimedia, video conferencing, database querying, office collaboration, etc.

In a networked file system, for example, files used by applications in one place might be stored in another place. In a typical scenario, a number of users operating at computers networked throughout an organization and/or a geographic region share a file or sets of files that are stored in a file system. The file system might be near one of the users, but it is often remote from most of the users. Even when files are remote, users expect or would prefer that the files appear to be near their sites. Otherwise, slow performance for file access can negatively impact a user's work productivity as time is wasted waiting for files to save and load, or waiting for application pauses while an application performs file I/O, and so forth.

As used herein, "client" generally refers to a computer, computing device, peripheral, electronics, or the like, that makes a request for data or an action, while "server" generally refers to a computer, computing device, peripheral, electronics, or the like, that operates in response to requests for data or action made by one or more clients.

A request can be for operation of the computer, computing device, peripheral, electronics, or the like, and/or for an application being executed or controlled by the client. One example is a computer running a word processing program that needs a document stored externally to the computer and uses a network file system client to make one or more requests over a network to a file server. Another example is a request for an action directed at a server that itself performs the action, such as a print server, a processing server, a control server, an equipment interface server, and I/O (input/output) server, etc.

A request is often satisfied by a response message supplying the data requested or performing the action requested, or a response message indicating an inability to service the request, such as an error message or an alert to a monitoring system of a failed or improper request. A server might also block a request, forward a request, transform a request, or the like, and then respond to the request or not respond to the request.

In some instances, an entity normally thought of as a server can act as a client and make requests and an entity normally thought of as a client can act as a server and respond to requests. Furthermore, a single entity might be both a server and a client, for other servers/clients or for itself. For example, a desktop computer might be running a database client and a user interface for the database client. If the desktop computer user manipulated the database client to cause it to make a request for data, the database client would issue a request, presumably to a database server. If the database server were running on the same desktop computer, the desktop computer would be, in effect, making a request to itself. It should be understood that, as used herein, clients and servers are often distinct and separated by a network, physical distance, security measures and other barriers, but those are not required characteristics of clients and servers.

In some cases, clients and servers are not necessarily exclusive. For example, in a peer-to-peer network, one peer might make a request of another peer but might also serve responses to that peer. Therefore, it should be understood that while the terms "client" and "server" are typically used herein as the actors making "requests" and providing "responses", respectively, those elements might take on other roles not clearly delineated by the client-server paradigm.

In general, communication over a network involves bidirectional exchange of data between two computing entities, where one entity is the client and initiates a transaction by opening a transport channel to another entity (the server). Typically, the client sends a request or set of requests via a set of network and transport protocols, and the request or requests are processed by the server, returning responses. Many protocols are connection-based, whereby the two cooperating entities (sometimes known as "hosts") negotiate a communication session to begin the information exchange. In setting up a communication session, the client and the server might each maintain state information for the session, which may include information about the capabilities of each other. At some level, the session forms what is logically (or physically, in some cases) considered a "connection" between the client and server. Once the connection is established, communication between the client and server can proceed using state from the session establishment and other information and send messages between the client and the server, wherein a message is a data set comprising a plurality of bits in a sequence, possibly packaged as one or more packets according to an underlying network protocol. Typically, once the client and the server agree that the session is over, each side disposes of the state information for the connection or connections underlying the session, other than possibly saving log information or other similar historical data concerning the session or its prior existence.

To effect such communication, computing hosts make use of a set of networking protocols for exchanging information between the two computing hosts. Many networking protocols have been designed and deployed, with varying characteristics and capabilities. At the network layer, the Internet Protocol (IP) is ubiquitous and is responsible for routing packets from one end host to another. At the transport layer, the Transmission Control Protocol (TCP) and the User Datagram Protocol (UDP) are two examples of protocols that are in common use today. TCP provides a reliable, connection-oriented service on top of the unreliable packet delivery service provided by IP. Various other networking protocols might also be used.

A message from a client to a server or vice-versa traverses one or more network "paths" connecting the client and server. A basic path would be a physical cable connecting the two hosts. More typically, a path involves a number of physical communication links and a number of intermediate devices (e.g., routers) that are able to transmit a packet along a correct path to the server, and transmit the response packets from the server back to the client. These intermediate devices typically do not modify the contents of a data packet; they simply pass the packet on in a correct direction. However, it is possible that a device that is in the network path between a client and a server could modify a data packet along the way.

A "transport proxy" or "proxy" is a device situated in the network that terminates a transport-level connection to perform various transformations or provide enhanced services to end hosts. The proxy is said to be "transparent", as the term is used herein, with respect to a client-server connection if the packets received by the client contains the server's network address and the packets received by the server contain the client's network address so as to the end hosts, the packets appear to the client as originating from the server even though they originate from the proxy, and vice versa.

As used herein, the terms "near", "far", "local" and "remote" might refer to physical distance, but more typically they refer to effective distance. The effective distance between two computers, computing devices, servers, clients, peripherals, etc. is, at least approximately, a measure of the difficulty of getting data between the two computers. For example, where file data is stored on a hard drive connected directly to a computer processor using that file data, and the connection is through a dedicated high-speed bus, the hard drive and the computer processor are effectively "near" each other, but where the traffic between the hard drive and the computer processor is over a slow bus, with more intervening events possible to waylay the data, the hard drive and the computer processor are said to be farther apart.

Greater and lesser physical distances need not correspond with greater and lesser effective distances. For example, a file server and a desktop computer separated by miles of high-quality and high-bandwidth fiber optics might have a smaller effective distance compared with a file server and a desktop computer separated by a few feet and coupled via a wireless connection in a noisy environment.

The two primary impediments to application protocol performance over a WAN are typically high delay (or latency) and limited bandwidth. The "bandwidth" of a network of channel refers to measure of the number of bits that can be transmitted over a link or path per unit of time. "Latency" refers to a measure of the amount of time that transpires while the bits traverse the network, e.g., the time it takes a given bit transmitted from the sender to reach the destination. "Round-trip time" refers to the sum of the "source-to-destination" latency and the "destination-to-source" latency. If the underlying paths are asymmetric, the round-trip latency might be different than twice a one-way latency. The term "throughput" is sometimes confused with bandwidth but refers to a measure of an attained transfer rate that a client-server application, protocol, etc. achieves over a network path. Throughput is typically less than the available network bandwidth.

WAN network bandwidth limits almost always impact client-server application throughput across the WAN, but more bandwidth often can be obtained from a network service provider, usually at a cost. With latency, however, lower latency is not available from a network service provider at any price, using known laws of physics, if it would require communications to occur at speeds faster than the speed of light. In some cases, network latency is the bottleneck on performance or throughput. This is often the case with window-based transport protocols such as TCP or a request-response protocol such as the Common Internet File System (CIFS) protocol or the Network File System (NFS) protocol. High network latency particularly slows down "chatty" applications, even if the actual amounts of data transmitted in each transaction are not large. "Chatty" applications are those in which client-server interactions involve many back-and-forth steps that might not even depend on each other. Adding bandwidth (or compressing data) does not improve the throughput of these protocols/applications when the round-trip time exceeds some critical point and once the latency reaches that critical point, throughput decays quickly.

This phenomenon can be understood intuitively: the rate of work that can be performed by a client-server application that executes serialized steps to accomplish its tasks is inversely proportional to the round-trip time between the client and the server. If the client-server application is bottlenecked in a serialized computation (i.e., it is "chatty"), then increasing the round-trip by a factor of two causes the throughput to decrease by a factor of two because it takes twice as long to perform each step (while the client waits for the server and vice versa).

Given the high costs and performance challenges of WAN-based enterprise computing and communication, many approaches have been proposed for dealing with these problems.

Perhaps the simplest approach to dealing with performance is to simply upgrade the available bandwidth in the network. Of course this is the most direct solution, but it is not always the most effective approach. First of all, contrary to popular belief, bandwidth is not free and the costs add up quickly for large enterprises that may have hundreds of offices. Second, as described above, adding bandwidth does not necessarily improve throughput. Third, in some places adding more bandwidth is not possible, especially across international sites, in remote areas, or where it is simply too expensive to justify.

Another approach involves data compression. Compression is a process of representing one set of data with another set of data wherein the second set of data is, on average, a smaller number of bits than the first set of data, such that the first set of data, or at least a sufficient approximation of the first set of data, can be recovered from an inverse of the compression process in most cases. Compression allows for more efficient use of a limited bandwidth and might result in less latency, but in some cases, no latency improvement occurs. In some cases, compression might add to the latency, if time is needed to compress data after the request is made and time is needed to decompress the data after it is received. This may be able to be improved if the data can be compressed ahead of time, before the request is made, but that may not be feasible if the data is not necessarily available ahead of time for compression, or if the volume of data from which the request will be served is too large relative to the amount of data likely to be used.

One way to deploy compression is to embed it in applications. For example, a Web server can compress the HTML pages it returns before delivering them across the network to end clients. This function has also been implemented within application delivery controllers that sit in front of Web servers to provide connection optimization, compression, and so forth.

Another approach is to deploy compression in the network without having to modify the applications. For many years, network devices have included compression options as features (e.g., in routers, modems, dedicated compression devices, etc). See, for example, [Rand96]. Prior to the advent of WAN accelerators, such as those shown in McCanne I and McCanne III, some vendors had developed dedicated network compression devices that compressed IP packets at the network layer in an attempt to enhance network performance. This is a reasonable thing to do, but the effectiveness is limited. When performance is limited by network latency, compressing the underlying data will have little or no impact on application performance. Moreover, most methods of lossless data compression typically reduce the amount of data (i.e., bandwidth) by a factor of 1.5 to 4, depending on the inherent redundancy present. While helpful, it is not enough to dramatically change performance if the amount of data being sent is large or similar data is sent repeatedly, perhaps over longer time scales.

Another approach to network compression is suggested by [Spring00]. As described in that reference, network packets that are similar to recently transmitted packets can be reduced in size by identifying repeated strings and replacing the repeated strings with tokens to be resolved from a shared packet cache at either end of a network link. This approach, while beneficial, has a number of shortcomings. Because it operates solely on individual packets, the performance gains that accrue are limited by the ratio of the packet payload size to the packet header (since the packet header is generally not compressible using the described technique). Also, because the mechanism is implemented at the packet level, it only applies to regions of the network where two ends of a communicating path have been configured with the device. This configuration can be difficult to achieve, and may be impractical in certain environments. Also, by caching network packets using a relatively small memory-based cache with a first-in first-out replacement policy (without the aid of, for instance, a large disk-based backing store), the efficacy of the approach is limited to detecting and exploiting communication redundancies that are fairly localized in time. Finally, because this approach has no ties into the applications or servers that generate the (redundant) network traffic, there is no ability to anticipate where data might be used and pre-stage that data in the far-end cache providing potential further acceleration and optimization of network traffic.

Rather than compress the data, another approach to working around WAN bottlenecks is to replicate servers and serve data from local servers for quick access. This approach in particular addresses the network latency problem because a client in a remote site can now interact with a local server rather than a remote server. There are several methods available to enterprises to store redundant copies of data in replicated file systems, redundant or local storage servers, or by using any number of distributed file systems. The challenge with this kind of approach is the basic problem of managing the ever-exploding amount of data, which requires scaling up storage, application and file servers in many places, and trying to make sure that the files people need are indeed available where and when they are needed. Moreover, these approaches are generally non-transparent, meaning the clients and servers must be modified to implement and interact with the agents and/or devices that perform the replication function. For example, if a file server is replicated to a remote branch, the server must be configured to send updates to the replica and certain clients must be configured to interact with the replica while others need to be configured to interact with the original server.

Rather than replicate servers, another approach is to deploy transport-level "proxies", which function as performance-enhancing intermediaries between the client and the server. In this case, a proxy is the terminus for the client connection and initiates another connection to the server on behalf of the client. In some cases, the proxy may operate solely at the transport layer, while in other cases, the proxy may possess application-layer knowledge and use this knowledge to transform the application-level payloads to enhance end-to-end performance. In addition, the proxy may connect to one or more other proxies that in turn connect to the server and these cascaded proxies may cooperate with one other to perform optimization. Each proxy may forward, modify, or otherwise transform the transactions as they flow from the client to the server and vice versa. Examples of proxies include (1) Web proxies that enhance performance through caching or enhance security by controlling access to servers, (2) mail relays that forward mail from a client to another mail server, (3) DNS relays that cache DNS name resolutions, (4) WAN accelerators, and so forth.

One problem that must be overcome when deploying proxies is that of directing client requests to the proxy instead of to the destination server. One mechanism for accomplishing this is to configure each client host or process with the network address information of the proxy. This requires that the client application have an explicit proxy capability, whereby the client can be configured to direct requests to the proxy instead of to the server. In addition, this type of deployment requires that all clients must be explicitly configured and that can be an administrative burden on a network administrator.

One way around the problems of explicit proxy configuration is to deploy a proxy in a transparent configuration. The presence of the transparent proxy is not made explicitly known to the client process, so all client requests proceed along the network path towards the server as they would have if there were no transparent proxy. This might be done by placing the transparent proxy host in the network path between the client and the server. A layer-4 switch can then be employed so the proxy host can intercept client connections and handle the requests via the proxy. For example, the layer-4 switch could be configured so that all Web connections (i.e., TCP connections on port 80) are routed to a local proxy process. The local proxy process can then perform operations on behalf of the server. For example, the local proxy process could respond to the request using information from its local cache. When intercepting the connection, the layer-4 switch performs network address translation ("NAT") so the connection appears to the client as having been terminated at the origin server, even though the client communicates directly with the proxy. In this manner, the benefits of a proxy can be realized without the need for explicit client configuration.

Some benefits of a transparent proxy require that a proxy pair exists in the network path, as is common with WAN accelerators. For example, if a proxy is used to transform data from a particular client-server connection in some way, a second proxy preferably untransforms the data. For example, where a connection between a client and a server is to be processed, a proxy near the client would transform the received transport payloads before sending said payloads to a proxy situated near the server, which would untransform the payload and send the original data on to the server, thereby providing for transparent transformation of data flowing between the client and the server.

For actions that require a proxy pair, preferably both proxies in the proxy pair do not perform a transformation unless they can be assured of the existence and operation of the other proxy in the proxy pair. Where each proxy must be explicitly configured with indications of the pairs to which it belongs and to the identity of the other members of those pairs, the administrative burden on a network administrator might well make some operations infeasible if they require proxy pairs. Even where a proxy is interposed in a network and gets all of the traffic from a client or server, it still must discover the other member for each proxy pair the proxy needs, if the proxy is to perform actions that require proxy pairs. As such, a proxy might be inserted in the network path between client and server via multiple network ports as described in Demmer I. As described there, the interception of network packets can be carried out transparently without the need for a layer-4 switch or some other method of network-based packet interception.

With a proxy situated between the client and server, the performance impairments of network latency can be addressed by having the proxy cache data. A proxy that performs this function has been called a "network cache". Generally speaking, caching is common technique in computer system design and involves a process of storing previously transmitted or obtained results in the hopes that an entity will request the results again and receive a response more quickly from the cache than if the results had to come from the original provider. Caching also provides some help in mitigating both latency and bandwidth bottlenecks, but in some situations it does not help much. For example, where a single processor is retrieving data from memory it controls and does so in a repetitive fashion, as might be the case when reading processor instructions from memory, caching can greatly speed a processor's tasks. Similarly, file systems have employed caching mechanisms to store recently accessed disk blocks in host memory so that subsequent accesses to cached blocks are completed much faster than reading them in from disk again as in [McKusick84], [Rosenblum92], etc. In a typical cache arrangement, a requestor requests data from some memory, device or the like and the results are provided to the requestor and stored in a cache having a faster response time than the original device supplying the data. Then, when the requester requests that data again, if it is still in the cache, the cache can return the data in response to the request before the original device could have returned it and the request is satisfied that much sooner.

Caching has its difficulties, one of which is that the data might change at the source and the cache would then be supplying "stale" data to the requester. This is the "cache consistency" problem. Because of this, caches are often "read only", requiring that changes to data be transmitted through the cache back to the source in a "write-through" fashion and that other caches that consequently end up with "stale" data be invalidated. Another problem with caching is that the original source of the data might want to track usage of data and would not be aware of uses that were served from the cache as opposed to from the original source. For example, where a Web server is remote from a number of computers running Web browsers that are "pointed to" that Web server, the Web browsers might cache Web pages from that site as they are viewed, to avoid delays that might occur in downloading the Web page again. While this would improve performance in many cases, and reduce the load on the Web server, the Web server operator might try to track the total number of "page views" but would be ignorant of those served by the cache. In some cases, an Internet service provider might operate the cache remote from the browsers and provide cached content for a large number of browsers, so a Web server operator might even miss unique users entirely.

Additionally, the mechanism underlying Web caching provides only a loose model for consistency between the origin data and the cached data. Generally, Web data is cached for a period of time based on heuristics or hints in the transactions independent of changes to the origin data. This means that cached Web data can occasionally become inconsistent with the origin server and such inconsistencies are simply tolerated by Web site operators, service providers, and users as a reasonable performance trade-off. Unfortunately, this model of loose consistency is entirely inappropriate for general client-server communication like networked file systems. When a client interacts with a file server, the consistency model must be wholly correct and accurate to ensure proper operation of the application using the file system.

Where loose consistency can be tolerated, caching can work remarkably well. For example, the Domain Name System (DNS), dating back to the early 1980's, employs caching extensively to provide performance and scalability across the wide area. In this context, providing only loose consistency semantics has proven adequate. In DNS, each "name server" manages a stored dataset that represents so-called "resource records" (RR). While DNS is most commonly used to store and manage the mappings from host names to host addresses in the Internet (and vice versa), the original DNS design and its specification allow resource records to contain arbitrary data. In this model, clients send queries to servers to retrieve data from the stored data set managed by a particular server. Clients can also send queries to relays, which act as proxies and cache portions of master name servers' stored datasets. A query can be "recursive", which causes the relay to recursively perform the query on behalf of the client. In turn, the relay can communicate with another relay and so forth until the master server is ultimately contacted. If any relay on the path from the client to the server has data in its cache that would satisfy the request, then it can return that data back to the requester.

Some solutions to network responsiveness deal with the problem at the file system or at network layers. One proposed solution is the use of a low-bandwidth network file system, such as that described in [LBFS]. In that system, called LBFS, clients employ "whole file" client-side caching whereby upon a file open operation, the client fetches all the data in the file from the server, then operates on the locally cached copy of the file data. If the client makes changes to the file, those changes are propagated back to the server when the client closes the file. To optimize these transfers, LBFS replaces pieces of the file with hashes when transmitting file data over the network and the recipient uses the hashes in conjunction with a local database to resolve the hashes to the original portions of the file. Such systems have limitations in that they are tied to file systems and generally require modification of the clients and servers between which responsiveness is to be improved. Furthermore, the hashing scheme operates over blocks of relatively large (average) size, which works poorly when files are subject to fine-grained changes over time. Finally, the scope of the LBFS design is limited to a network file system protocol whereby the LBFS hashing scheme is not shared with other data or network services.

In a scheme that builds on some of the concepts of LBFS, [Tolia03] proposed the CASPER distributed file system. CASPER uses "file recipes" to represent the data of each file, where a file recipe is list of hashes of the sequences of bytes that represent the file. When a client opens a file, a proxy at the client fetches the file recipe from a "recipe server" that is co-located with the file server. The client then attempts to reconstruct the file data by issuing requests to a local server that can resolve a recipe hash to its corresponding data. Any recipe hashes that cannot be resolved locally are sent to the recipe server for resolution. The approach, however, does not provide details for how client writes would be handled and defers such mechanism to future work. Also, like LBFS, the scope of the CASPER design is limited to a network file system protocol whereby the hashes used in file receipts are not shared with other data or network services. Also, while file recipes reduce the amount of network traffic required to serve files, there is no deduplication of the data that comprises the files on the server and, in fact, storage requirements are increased because each file's recipe must be stored in addition to each file's data. The CASPER design is also limited to a configuration wherein whole-file caching is carried out on the client system and the client-side file system is configured explicitly to intercommunicate with the local CASPER implementation. Moreover, CASPER has no mechanisms to optimize other operations like directory lookups, directory modifications, file creation and deletion, and so forth.

Cache consistency in the context of network file systems has been studied. The primary challenge is to provide a consistent view of a file to multiple clients when these clients read and write the file concurrently. When multiple clients access a file for reading and at least one client accesses the same file for writing, a condition called "concurrent write sharing" occurs and measures must be taken to guarantee that reading clients do not access stale data after a writing client updates the file.

In the original Network File System (NFS) [Sandberg85], caching is used to store disk blocks that were accessed across the network sometime in the past. An agent at the client maintains a cache of file system blocks and, to provide consistency, their last modification time. Whenever the client reads a block, the agent at the client performs a check to determine if the requested block is in its local cache. If it is and the last modification time is less than some configurable parameter (to provide a medium level of time-based consistency), then the block is returned to the client by the agent. If the modification time is greater than the parameter, then the last-modification time for the file is fetched from the server. If that time is the same as the last modification time of the data in the cache, then the request is returned from the cache. Otherwise, the file has been modified so all blocks of that file present in the local cache are flushed and the read request is sent to the server. To provide tighter consistency semantics, NFS can employ locking via the NFS Lock Manager (NLM). Under this configuration, when the agent at the client detects the locking condition, it disables caching and thus forces all requests to be serviced at the server, thereby ensuring strong consistency.

When blocks are not present in the local cache, NFS attempts to combat latency with the well-known "read-ahead" algorithm, which dates back to at least the early 1970's as it was employed in the Multics I/O System [Feiertag71]. The read-ahead algorithm exploits the observation that file-system clients often sequentially read large sets of contiguous blocks from a file. That is, when a client accesses block k, it is likely in the future to access block k+1. In read-ahead, a process or agent fetches blocks ahead of the client's request and stores those blocks in the cache in anticipation of the client's forthcoming request. In this fashion, NFS can mask the latency of fetching blocks from a server when the read-ahead turns out to successfully predict the client read patterns. Read-ahead is widely deployed in modern file systems.

In the Andrew File System (AFS) [Howard88], "whole-file" caching is used instead of block-based caching to enhance file system performance over a network. Here, when a client opens a file, an agent at the client checks to see if the file is resident in its local disk cache. If it is, it checks with the server to see if the cached file is valid (i.e., that there have not been any modifications since the file was cached). If not (or if the file was not in the cache to begin with), a new version of the file is fetched from the server and stored in the cache. All client file activity is then intercepted by the agent at the client and operations are performed on the cached copy of the file. When the client closes the file, any modifications are written back to the server. This approach provides only "close-to-open" consistency because changes by multiple clients to the same file are only serialized and written back to the server on each file close operation.

Another mechanism called "opportunistic locking" is employed by the Server Message Block (SMB) Protocol, now called CIFS, to provide consistency. In this approach, when a file is opened the client (or client agent) can request an opportunistic lock or oplock associated with the file. If the server grants the oplock, then the client can assume no modifications will be made to file during the time the lock is held. If another client attempts to open the file for writing (i.e., concurrent write sharing arises), then the server breaks the oplock previously granted to the first client, then grants the second client write access to the file. Given this condition, the first client is forced to send all reads to the server for the files for which it does not hold an oplock. A similar mechanism was employed in the Sprite distributed file system, where the server would notify all relevant clients when it detected concurrent write sharing [Nelson88].

When consistency mechanisms are combined with network caching, a great deal of complexity arises. For example, if a data caching architecture such as that used by DNS or the Web were applied to file systems, it would have to include a consistency protocol that could manage concurrent write sharing conditions when they arise. In this model, each node, or network cache, in the system contains a cache of file data that can be accessed by different clients. The file data in the cache is indexed by file identification information, relating the data in the cache to the server and file it came from. Just like NFS, a cache could enhance performance in certain cases by using read-ahead to retrieve file data ahead of a client's request and storing said retrieved data in the cache. Upon detecting when concurrent write sharing occurs, such a system could force all reads and writes to be synchronized at a single caching node, thereby assuring consistency. This approach is burdened by a great deal of complexity in managing consistency across all the caches in the system. Moreover, the system's concurrency model assumes that all file activity is managed by its caches; if a client modifies data directly on the server, consistency errors could arise. Also, its ability to overcome network latency for client accesses to data that is not resident in the cache is limited to performing file-based read-ahead. For example, in NFS, a client that opens a file must look up each component of the path (once per round-trip) to ultimately locate the desired file handle and file-based read-ahead does nothing to eliminate these round-trips.

A different approach to dealing with network latency when clients access data that is not in the cache is to predict file access patterns. A number of research publications describe approaches that attempt to predict the next file (or files) a client might access based on the files it is currently accessing and has accessed in the past, see [Amer02], [Lei97], [Griffioen94], [Kroeger99], for example. Based on these prediction models, these systems pre-fetch the predicted files by reading them into a cache. Unfortunately, this approach presumes the existence of a cache and thus entails the complexities and difficulties of cache coherency.

In the context of the World-wide Web, other research has applied this prediction concept to Web objects [Padmanabhan96]. In this approach, the server keeps track of client access patterns and passes this information as a hint to the client. The client in turn can choose to pre-fetch into its cache the URLs that correspond to the hinted objects. Again, this approach presumes the existence of a cache, and can be deployed without disrupting the semantics of the Web protocols only because the Web is generally read-only and does not require strong consistency.

As enterprises have come to depend more and more on distributed access to data, the performance problems described herein have become more pervasive and noticed by protocol and application designers. In the context of file server protocols, attempts have been made in recent versions of NFS to address some of the challenges file server access over the wide area. In particular, NFS version 4 (NFSv4) includes the notion of "compound operations" where multiple requests (and responses) can be bundled into a single network message payload and, at the server, the result from one request is fed to the input of the next operation in that same message, and so forth. The goal here is to reduce the number of wide-area round trips that transpires between the client and server thereby enhancing performance. Also, NFSv4 includes a mechanism called a "delegation" whereby a file can be cached at the client and operations performed on the file locally. While compound operations and delegations can be exploited to enhance wide area file server performance, they have limited impact. In particular, while compound operations are potentially helpful, in practice it is difficult for a client implementation to utilize them extensively enough to impact WAN performance without changing the way an application interfaces to and interacts with the file system and making such changes is, in general, not practical. Likewise, while delegations can also be helpful, they still rely upon transporting the data from the file server to the client over the network, which may be a costly and performance impairing operation in many environments. In short, while recent improvements to file system design are in general helpful to wide-area performance problems, they fall short of solving such problems comprehensively.

While the advent of WAN accelerators (such as those described in McCanne I, McCanne II, and McCanne III) has proven that excellent performance for network file access can be achieved over a WAN, certain performance improvements might be possible to the way that existing file servers and WAN accelerators interoperate.

For example, there may still remain duplication of effort, such as when a file is read multiple times by one or more clients. Another problem might occur with redundant transformations. Yet another problem with existent file server protocol designs is that they presume a tight coupling between a file and its underlying data and this coupling imposes certain constraints on file server network protocols. When a file is to be accessed from a remote location, the data underlying each accessed portion of the file must be transported over the network. This is typically accomplished by the client issuing read requests to the server for the data desired with respect to the file in question. Likewise if the client modifies the file, new data representing the modifications must be transported over the network using write requests sent to the server. If there are pending writes when the client closes the file, the client must typically block and wait for all for the pending writes to completed and be acknowledged by the server before the close operation can finish. This is typically perceived by the user as the application hanging or waiting for a save operation to complete. When the network has high latency or inefficient bandwidth, these sorts of data operations can be highly inefficient and burdensome to the user. This overall issue is sometimes called the "cold write performance" problem because write performance suffers for "cold" data, where so-called cold data is data that is not currently in the WAN accelerators' segment stores.

The cold write performance problem is illustrated in FIG. 1, which occurs when the client writes new data to a file and immediately closes that file. When new data is encountered by a WAN accelerator and that data is not present its segment store, the WAN accelerator must transmit the new data across the network. For example, in McCanne I, new data is sent in the form of segment bindings for newly established segments. FIG. 1 shows the exchange of messages in this case. Here the file is first opened, then write commands 100, 101, . . . , 104 are transmitted from the client to the server, along with the data payloads that comprise the write requests. To optimize the protocol, the WAN accelerator pipelines the write requests by pre-acknowledging the write requests with write acknowledgments 110, 111, . . . , 114. Because the write messages are pipelined in this fashion, the protocol exchange from the client's perspective performs efficiently up until the close request is processed. At this point, the client-side WAN accelerator is unable to pre-acknowledge the close request until all of the pipelined writes have been processed at the server ensuring that all of the data has been safely written. Otherwise, if the client-side WAN accelerator acknowledged the close request before this occurred, the file server protocol semantics could be violated and conditions could arise under which the client had received a successful acknowledgment of the writes and the close, but the data never made it safely onto stable storage (e.g., because the file server crashes after the close is acknowledged but before the data is written to disk). Because of this, the client-side WAN accelerator must defer acknowledging the close until all the writes have been acknowledged at the server. When there are many new segments to be transmitted over a possibly bandwidth-constrained link, this operation can take a non-trivial amount of time. Thus, the client can perceive a noticeable delay while the close is waiting on the writes to complete. This delay is depicted as the "hang time" interval indicated on the diagram.

Another challenge for WAN accelerators with regard to file server protocols is the so-called CAP theorem. Conjectured by Brewer in 2000 [Brewer00], and later proved by Gilbert and Lynch [Gilbert02], the CAP theorem states that a distributed data services architecture cannot achieve both data consistency and data availability in the face of network partitions. In other words, consistency (C), availability (A), and partition-tolerance (P), or CAP, cannot all simultaneously coexist, but rather, at most two of the three said properties can co-exist. In general, with respect to file server protocols, WAN accelerators favor consistency over availability and do not allow a client to read or modify a file in the face of a network partition. However, this mechanism works only for files that are presently open when the network partition arises. If a client at a remote site wishes to access a file while a network partition exists, a WAN accelerator has no means by which to allow such access to occur without being able to contact the origin file server. It would be desirable, however, to allow such accesses to occur based on IT policies that control where the available access points lie for a given file server (or file share on a file server) in the face of network partitions.

Unfortunately, while many of the above techniques solve some aspects of WAN performance and file storage and serving problems, they still have some shortcomings and several challenges remain in the way that existing WAN accelerators and file servers intercommunicate. In view of the above problems and the limitations with existing solutions, improvements can be made in how file servers and WAN accelerators operate and interact over a network.

SUMMARY OF THE INVENTION

In a network including WAN accelerators and segment-oriented file servers, a method comprises responding to a client request to manipulate a file via a network file protocol by receiving a first request at a first WAN accelerator, wherein the request is a request to open a file located at a file server that is a segment-oriented file server, sending a local request for the file, corresponding to the first request, from the WAN accelerator to the file server, using a segment-aware network request protocol, returning at least a portion of the requested file in the form of a representation of a data map corresponding to the at least a portion of the requested file stored on the file server and using a data map for reconstruction of the requested file.

BRIEF DESCRIPTION OF THE DRAWINGS

FIG. 8 shows an example of how files might be structured in an SFS server.

DETAILED DESCRIPTION OF THE INVENTION

The present invention relates generally to file system access optimized for constrained bandwidth and/or high-latency network paths and more particularly to performing network file data manipulations over a constrained network path faster than if the file were manipulated using customary file access protocols over the constrained path. In addition, the present disclosure explains how file servers can store and manage data in the file system in a fashion that is more efficient and more compact than storing the data for each file in a traditional form.

While the advent of WAN accelerators (such as those described in McCanne I, McCanne II, and McCanne III) has proven that excellent performance for network file access can be achieved over a WAN, certain performance improvements might be possible to the way that existing file servers and WAN accelerators interoperate. A first challenge can be illustrated by the simple configuration of WAN accelerators, a client, and a file server depicted FIG. 2.

Figure 1:
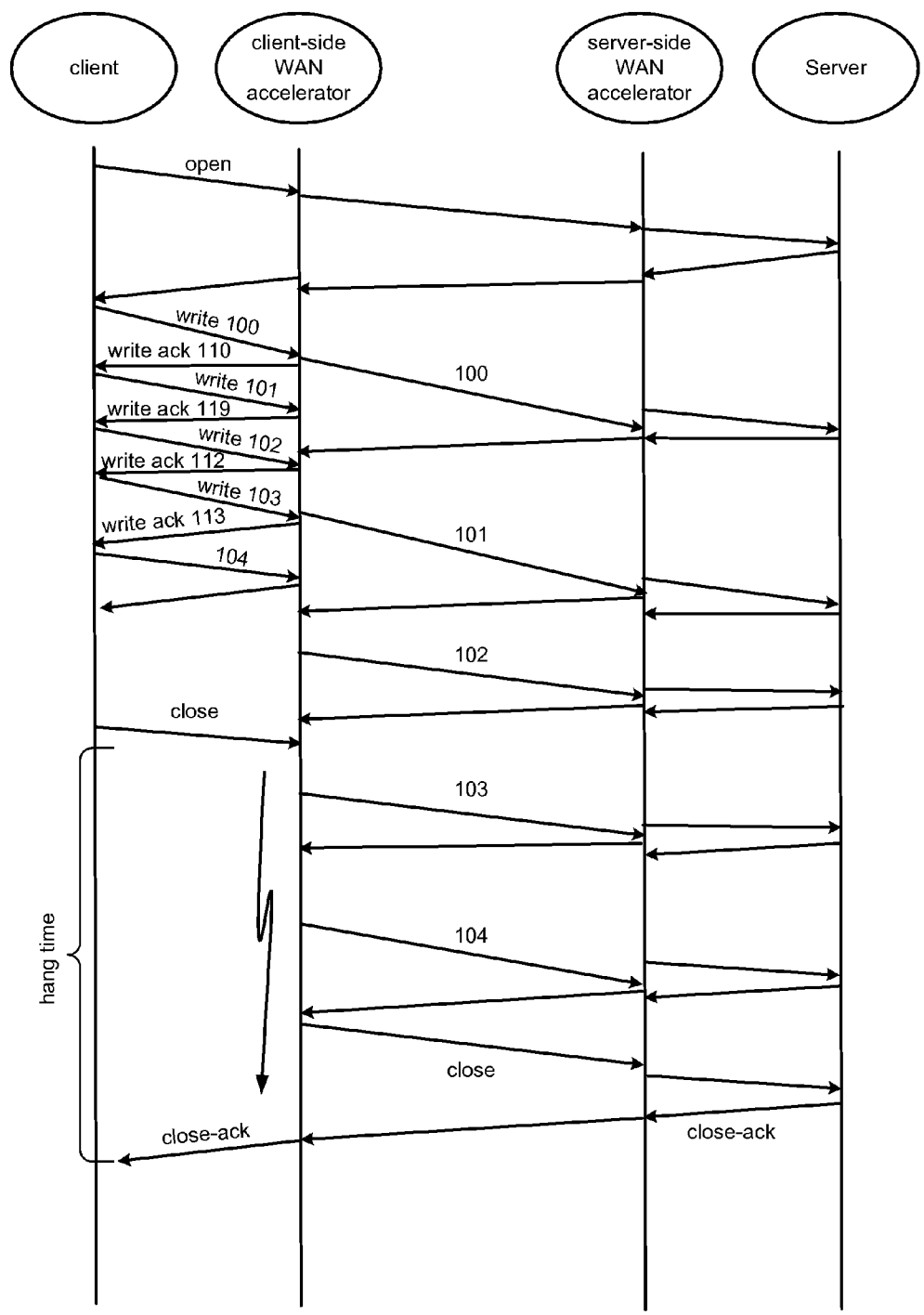
FIG. 1 is a swim diagram illustrating an example of a session in which a cold write performance problem might arise that might be solved by aspects of the present invention.
Figure 2:
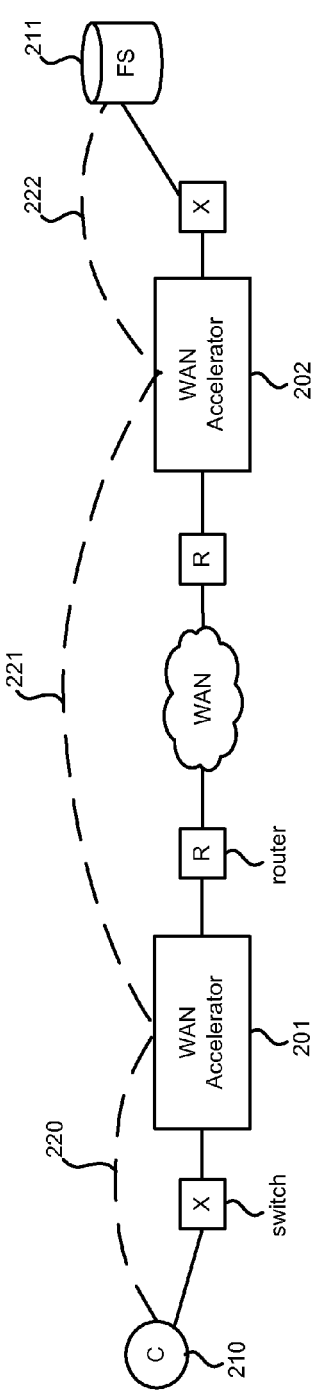
FIG. 2 illustrates the operation of WAN accelerators.

In FIG. 2, WAN accelerators 201 and 202 are situated on either side of a WAN link. Client 210 is situated near WAN accelerator 201 and file server 211 is situated near WAN accelerator 202. For the purposes of illustration, WAN accelerator 201 is often called the "client-side accelerator" while WAN accelerator 202 is often called the "server-side accelerator" though, in general, a single device may operate as a client-side accelerator for one or more connections and as a server-side accelerator for one or more other connections, depending on the configuration of the clients and servers and the connections among them. Suppose client 210 opens and reads a file from server 211 via transport connections 220, 221, and 222. In the approach described in McCanne I and McCanne III, as this occurs, WAN accelerator 202 predictively reads data blocks on behalf of the client, transports those blocks via segment-based data reduction (or "deduplication") to accelerator 201, which stores the predicted reads in a prediction buffer. As part of this process, the data segments that comprise the transported data are stored in the accelerators' "segment store" along with associated bindings between "segment names" and "segment data". Herein, segment names are also referred to as "segment labels" or simply "labels".

There are many possible approaches for segmenting data for the purposes of deduplication. One such approach is the hierarchical segmentation scheme described in McCanne II. Other schemes and variations are possible.

Continuing the example of FIG. 2, suppose sometime later, the client opens and reads the same file. The process then repeats, whereby the file data is read by WAN accelerator 202, segmented, and transported efficiently via segment names to WAN accelerator 201 via transport connection 221. A performance scaling challenge with this approach is that each time the data is read, it must be processed at full volume, matched against the segment store, and reconstructed at the far end. In practice, this approach has proven to be enormously effective in real world deployments. However, there may be further improvements, wherein system need not always process the full volume of data for a particular file every time that file is encountered. Embodiments of the present invention described herein have that capability.

Figure 3:
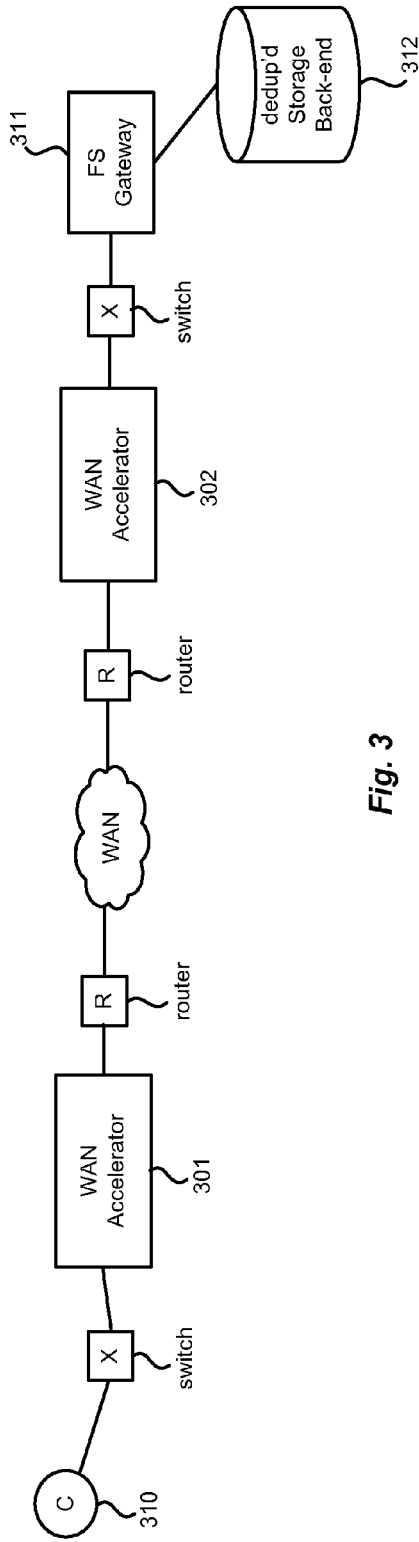
FIG. 3 illustrates the operation of WAN accelerators with a storage deduplicating back end.

A further inefficiency arises with previous approaches when the file server includes a storage deduplicating back end, as described in McCanne II. FIG. 3 illustrates this configuration. Here, WAN accelerators 301 and 302 are situated on either side of a WAN link. Client 310 is situated near WAN accelerator 301 and deduplicating file server gateway 311 with deduplicating back-end 312 is situated near WAN accelerator 302. Suppose client 310 opens and reads a file from server 311 via transport connection 320. Similar to the case above, as this occurs, WAN accelerator 302 predictively reads data blocks on behalf of the client by sending read requests to the server. To respond to these read requests, the file server reconstructs the requested file contents by assembling it from the various segments that comprise the file, e.g., as described in McCanne II. That is, the file server begins with a representation of the file as a sequence or list of segment names, and reconstructs the file data by invoking the deduplicating backend to read the segment data corresponding to the segment names from a segment store. Once the file contents have been reconstructed, the file server responds to the read requests by sending the requested data blocks over the network to the WAN accelerator 302. Next, the responses to the read requests are collected up at WAN accelerator 302 and processed by segmenting the data and looking up the segments in the segment store of WAN accelerator 302. As before, the segment names are then transported efficiently over the network to WAN accelerator 301, which reconstructs the predicted reads from the segment names using its local segment store.

Figure 4:
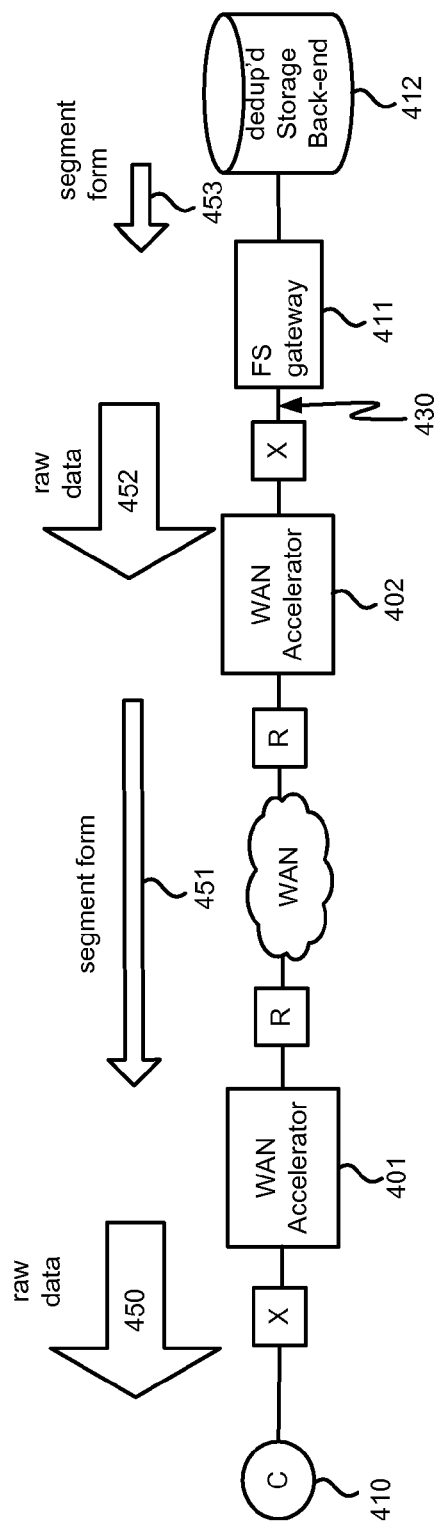
FIG. 4 illustrates an example operation of WAN accelerators.

While this approach has proven to be of value in practice and has been deployed in real environments, an area of improvement with this model is highlighted in FIG. 4. The arrows in this diagram roughly depict the volume of data flowing from and between the various system components. One concern here is that the data is subject to redundant transformations. That is, the file data is first read from the deduplicating storage backend 412 in its efficient segment form, i.e., see arrow 453. In turn, the data is decoded from its segmented form into its large, "exploded" or raw form by the file server gateway 411. Then, the raw data is transmitted to accelerator 402 over a legacy file system interface 430. The data is next re-encoded by accelerator 402 into segment form and transmitted over the WAN. Overall this process can be very inefficient as otherwise manipulating data by segment labels in its segmented form can often be hundreds of times more efficient than manipulating the data directly in its raw form. This means the system and network bottlenecks between file server gateway 411 and accelerator 402, as well as within the file server and the accelerators themselves, are subject to the full load of processing the raw data. Yet, one advantage of this approach is that the file system interface 430 is typically a widely deployed standardized protocol like CIFS or NFS, allowing such a system to interoperate with existing servers and systems.

A problem with previous file server protocol designs is that they presume a tight coupling between a file and its underlying data and this coupling imposes certain constraints on file server network protocols. When a file is to be accessed from a remote location, the data underlying each accessed portion of the file must be transported over the network. This is typically accomplished by the client issuing read requests to the server for the data desired with respect to the file in question. Likewise if the client modifies the file, new data representing the modifications must be transported over the network using write requests sent to the server. If there are pending writes when the client closes the file, the client must typically block and wait for all for the pending writes to completed and be acknowledged by the server before the close operation can finish. This is typically perceived by the user as the application hanging or waiting for a save operation to complete. When the network has high latency or inefficient bandwidth, these sorts of data operations can be highly inefficient and burdensome to the user. This overall issue is sometimes called the "cold write performance" problem because write performance suffers for "cold" data, where so-called cold data is data that is not currently in the WAN accelerators' segment stores.

Rather than solve the problems of poor file server performance over a WAN using WAN accelerators and traditional file servers, a new approach is provided by embodiments of the present invention described herein that utilizes new functionality embedded in a WAN accelerator combined with new functionality embedded in a file server. This approach avoids the cache coherency problems that arise in network caching by representing a file's structure separately from its underlying data. This separation is accomplished in a fashion that is compatible with the data representation model utilized by WAN accelerators thereby deriving performance efficiencies from the way the modified file servers intercommunicate with the modified WAN accelerators.

Novel constructions described herein include a combination of a segment-oriented file server with a segment-oriented WAN accelerator such that the two distinct device types intercommunicate with one another using a common segment-oriented data representation model. In this approach, a WAN accelerator need not communicate with a file server using a traditional file access protocol like CIFS or NFS, but instead can communicate via a new file server protocol that explicitly includes a segment-oriented data model. This new protocol could be an entirely new file server protocol or it could be an extension of an existing protocol such CIFS or NFS or similar protocol. Herein, this enhanced protocol is referred to as the segment-oriented file server protocol, or "SFS".

With SFS, WAN accelerators and segment-oriented file servers can be combined to produce a distributed storage system that is centrally managed, fully consistent, highly available providing "LAN like" performance from a remote site to a data center site across a WAN.

Accordingly, a "segment-oriented file server" ("SFS file server") is a storage device that represents files in a segment-based structure that is compatible with the segment-based structure used by segment-based WAN accelerators. By speaking the same "language" as WAN accelerators, an SFS file server becomes more scalable, more WAN-friendly, and more disk-space efficient, compared to traditional file servers, when combined with a network of WAN accelerators, such as Steelhead™ appliances or other accelerators, to form a "Wide-area Data Services (WDS) Storage System."

A segment-oriented file server gateway ("SFS gateway") can be constructed as a special case of an SFS filer server that has one or more traditional file servers or "filers" in its backend to store data. By leveraging the functionality and operational practices of existing deployments of filers, the implementation of an SFS gateway can be simpler than a more general SFS file server.

An SFS gateway can appear to end users as a standard file server or "filer" itself, even though it sits in front of one or more other filers. For example, it might have an IP address, a server name, and a collection of file shares that an administrator provisions. It interacts with authentication servers, such as one or more Windows® domain controllers, to provide fine-grained user access controls just like any other filer or Windows® storage server. It can fit seamlessly into a Windows® environment by supporting the CIFS file access protocol, thereby permitting any Windows® desktop to mount any file share present on the SFS gateway. In addition, an SFS gateway can include a network access mechanism that is optimized for direct communication with a network of WAN accelerators such as Steelhead™ appliances or other WAN accelerators. This access mechanism might be enabled as an extension to existing file access protocol like CIFS (e.g., by having the client and server specify a new dialect of CIFS using the CIFS "negotiate" protocol messages in the session setup process), or it might be accessed as another protocol available via a well-known transport port. WAN accelerators and SFS gateways can intercommunicate using the SFS protocol.

In other embodiments, the SFS gateway has multiple IP addresses and multiple server names. In certain deployment configurations, the SFS gateway may take over the identity of one or more backend files in a transparent fashion thereby facilitating deployment, e.g., by taking over the IP address of the file server, the server's name in the Windows® domain, or a combination thereof.

An SFS gateway need not actually store any file data and in some embodiments, it does not. Instead, it acts as a gateway between a client and one or more backend filers. While an SFS gateway exports a standard file server interface outward to the end clients (in addition to the SFS protocol it exports to WAN accelerators), the information stored on the backend filers is cast into a format layered on top of the backend file system, such as an SFS-specific format that is WDS-optimized and deduplicated. Thus, an SFS gateway provides for a WDS-optimized file system built on top of the backend filer's existing file system. Because this file system is built on top of existing filer deployments that have sustained many years of refinements and maturation, the problem of achieving data integrity for the SFS gateway is far simpler compared to an SFS server having to implement a native file system and volume manager within that device.

A "segment-oriented file server" often refers to a storage device that intercommunicates directly with WAN accelerators using the language and protocols adopted by WAN accelerators to enhance protocol performance of wide-area networks. A "segment-oriented file server gateway" often refers to a segment-oriented file server devised as a storage appliance that sits in front of network-attached storage servers (NAS) or "filers", making them more scalable, more WAN friendly, and more disk-space efficient when combined with a network of WAN accelerators, such as Steelhead™ appliances or other WAN accelerators, to form a "Wide-area Data Services (WDS) Storage System." A segment-oriented file server may optionally use the segment-based structure of file data it stores and manages.

Deployment Scenarios

Figure 5:
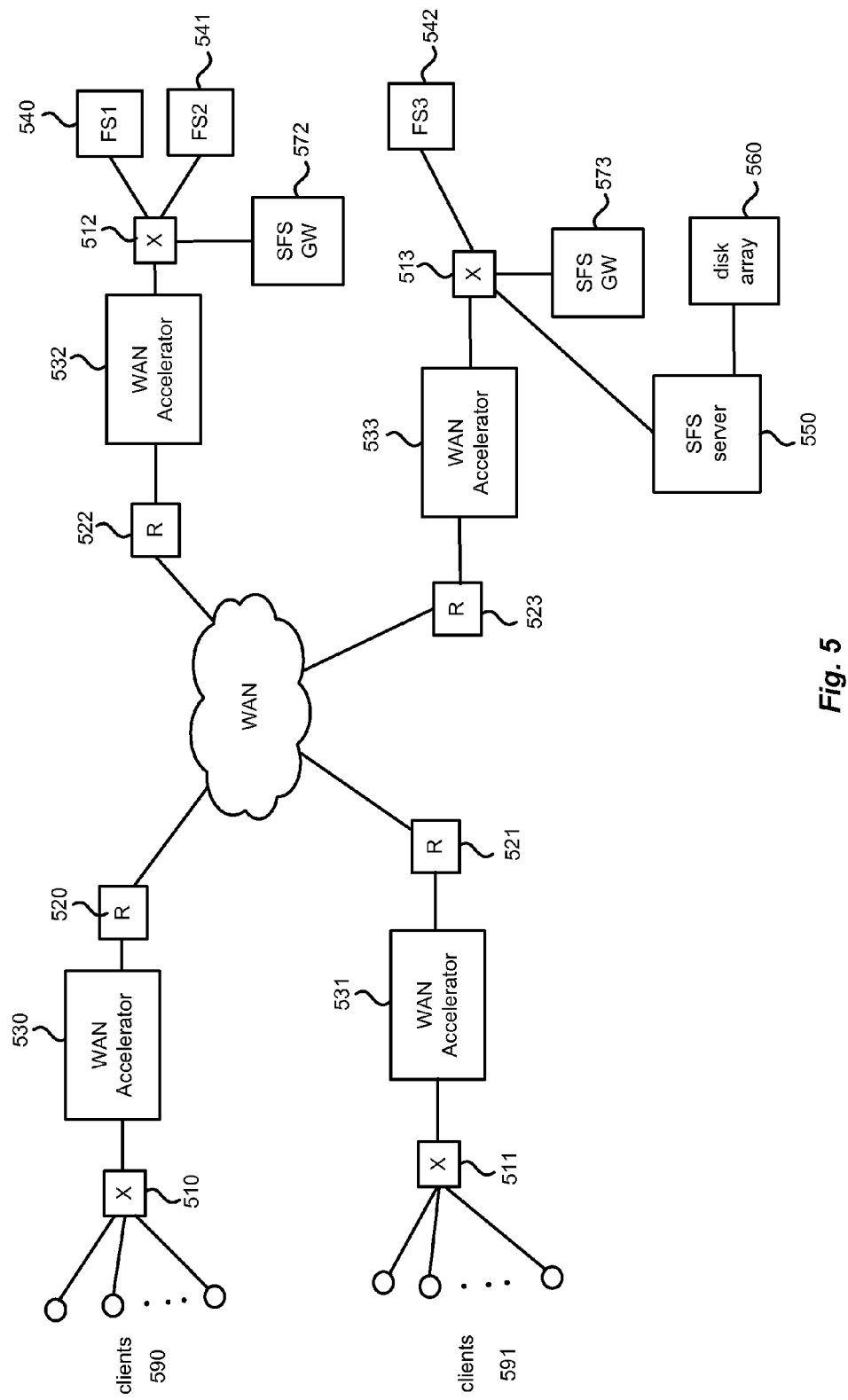
FIG. 5 illustrates an arrangement wherein two SFS gateways are situated at two different sites in a network along with WAN accelerators configured at each site.

To illustrate how SFS gateways and SFS servers are deployed, FIG. 5 depicts one configuration of an embodiment of the present invention where two SFS gateways are situated at two different sites in a network along with WAN accelerators configured at each site. In this configuration, clients in groups 590 and 591 access files ultimately stored on file servers 540, 541, and 542. The clients access these file servers directly using native file server protocols like CIFS and NFS by mounting a file system or "file share". Once the share is mounted via a transport connection, files can be accessed and manipulated over that connection by applications or file system tools invoked by the user. Traditionally, these protocols have performed poorly over the WAN but are accelerated by the WAN accelerators present in the network. For example, a client in group 591 might access file server 540 and WAN accelerators 530 and 532 would optimize that file server connection, typically providing "LAN-like" performance over the WAN using techniques as those described in McCanne I, McCanne II and McCanne III.

Further benefits are achieved, however, by arranging for clients to access the files stored on file servers 540, 541 and 542 via the SFS gateways 572 and 573. In this scenario, SFS gateway 572 exports one or more file shares that are in turn stored on backend filers 540 and/or 541. Similarly, SFS gateway 573 exports one or more file shares that are in turn stored on backend filer 542. Then, a client, for example, from group 591 mounts one of the exported shares located on SFS gateway 573 via a transport connection. This transport connection is then optimized by WAN accelerators 531 and 533. Furthermore, because these WAN accelerators are SFS-aware, they intercommunicate with SFS gateway 573 using SFS rather than a legacy file protocol like CIFS or NFS. In turn, the SFS gateway stores all of the data associated with the file share on the backend filer 542. As described later herein, enhanced performance is achieved by accessing manipulating files via the SFS gateway compared to manipulating files over a WAN-accelerated file connection directly to the backend filer because the protocol activity over the WAN is improved and further because the storage required to store the files on the backend file servers is reduced by storing the file in a deduplicated format.

In another embodiment of the present invention, the benefits of the SFS architecture can accrue to an SFS file server as depicted in FIG. 5, whereby SFS server 550 is interconnected to disk array 560. In this scenario, the SFS server manages its own file system on a raw volume directly, e.g., located on a disk array and accessed via iSCSI or Fibre channel over a storage-area network (SAN). In this scenario, there is no need for backend filers, but the SFS server must then implement its own file system and attain the same level of data integrity, reliability, and availability of an enterprise-class file server. Such a configuration could include an external disk array as depicted, or the server could be built around internal disk-based storage. The SFS server is configured by an administrator to export one or more file shares. Then, a client, for example, from group 590 mounts one of the exported shares located on SFS server 550 via a transport connection. This transport connection is then optimized by WAN accelerators 530 and 533. Furthermore, because these WAN accelerators are SFS-aware, they intercommunicate with SFS server 550 using SFS rather than a legacy file protocol like CIFS or NFS. In turn, the SFS server stores all of the data associated with the file share on its internal disks or external storage volume over a SAN.

Figure 6:
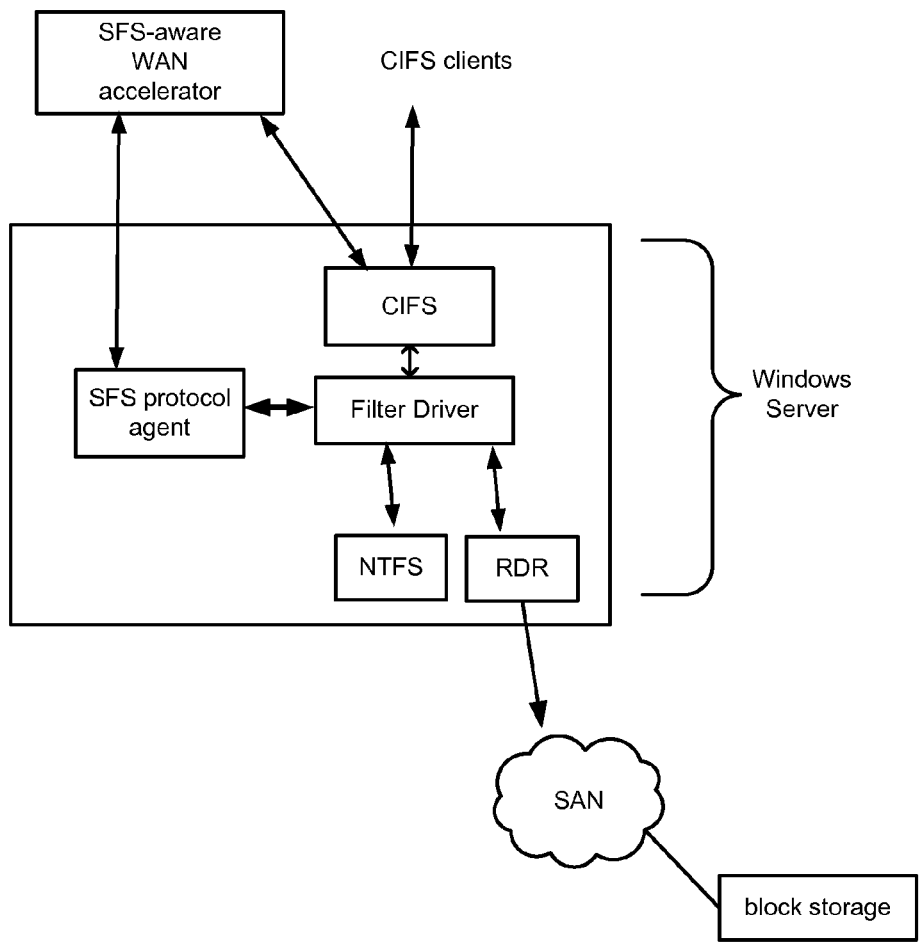
FIG. 6 illustrates the use of an SFS agent in a file server.

In other embodiments, the SFS server is realized by integrating a new protocol module into an existing vendor's file server product. For example, FIG. 6 depicts an "SFS agent" embedded in a Windows® file server. The agent is interposed into the file system via a Windows® filter driver interface. In this approach, when a client or clients access a file on the server via CIFS, the SFS agent may intervene, thereby translating normal file system reads and writes into modified reads and writes that manipulate the SFS data structures described herein. In addition, the agent may interact with an SFS-aware WAN accelerator to perform operations in accordance with the SFS protocols and algorithms.

The Data Map

Rather than represent each file as a set of data blocks as in a traditional filer, an SFS gateway or SFS server represents each file with an entity called a "data map". A data map defines a file in terms of the same "language" that WAN accelerators use to communicate data to one another. An example of this SFS protocol/language is Riverbed's scalable data representation, SDR, used by Steelhead™ appliances and this language can become, in effect, the lingua franca for data representation, whether the data is flowing over the WAN through Steelhead™ appliances, through other accelerators, or sitting in stable storage on a filer behind an SFS gateway.

The SFS data map provides a globally unique, abbreviated description of the data that underlies the file. A data map is associated with each file on a file server and induces a separation between the structure of the file, including its metadata, and the actual data underlying the file. The present invention extends the notion of metadata to include not just the traditional elements like the file's name, size, permissions, creation time, modification, time and so forth, but also includes the file's data map. The global nature of the descriptions may depend on the domain of use. For example, if the SFS data is expected to be used only within a particular organization and set of computers, its descriptors might not need to be unique over all possible computing systems, but should be unique over all possible computing systems in that domain. Of course, where files are open to anyone, anywhere, it would be good to have globally unique descriptions that are worldwide and beyond, or at least so with a very high probability.

The data map, described in more detail below, provides a layer of indirection between the file and its data via a globally unique naming scheme. Each data map comprises a collection of names of segments of data, such that the aggregate of all such segments constitutes the underlying data of the file. Some files can also contain some unsegmented data. Provided SFS file servers and SFS-aware WAN accelerators use the same data segmentation and naming scheme, high efficiencies in communication, computation, and storage can be achieved.

By associating a data map with each file on an SFS file server or SFS gateway, files can be very efficiently transported across the network by sending the file's data map instead of all of the bytes that comprise the file. For example, when an entity fetches a file from an SFS file server, it can simply fetch the file's comparatively lightweight data map. If the segments comprising the data map entries are already present at that location, then no further data needs to be sent and the entire file can be reconstructed from local store. Or, if the segments comprising the data map entries are not present at that location, they can be retrieved on demand asynchronously, and possibly in the background, allowing processes to proceed without all the data when the data is not absolutely necessary to proceed, e.g., as in a file copy operation where the copied data is not accessed until later.

Because data is represented in this common format, an overall system of WAN accelerators and SFS gateways scales much better across a wide range of dimensions. For example, each time a file is served or transported, the WAN accelerators are relieved from recomputing the SDR structure, as this structure is already present in the persistently stored data map. Similarly, because an SFS gateway serves data maps rather than actual data and because a data map is normally vastly smaller than its corresponding file, far less work is imposed on the SFS gateway and backend filers for a given workload because far fewer bytes move through this part of the system. Also, as new data is created by users at the edge of the network, the work of translating arbitrary file data into data maps is carried out in a distributed fashion across the ensemble of WAN accelerators at the edge of the network, rather than concentrating all such work at a centralized data center device.

In SDR, data is broken up into small segments and labels are assigned to each segment. Since SDR tends to assign the same labels to the same data patterns, an SFS gateway can use the SDR-based file map representation to "deduplicate" the data comprising the files on the backend filers. To this end, an SFS gateway maintains a large repository of segments, called the segment store, on one or more backend filers. The segment store contains mappings from SDR labels to segment data thereby allowing the translation of a sequence of labels comprising a data map to the underlying data represented by that data map. Unlike the persistent, but partly ephemeral, segment store within an SDR-based WAN accelerator, the SFS gateway stores segments indefinitely until they are explicitly deleted. Moreover, since each segment tends to be stored just once, redundancies in file data can be eliminated.

Whenever a new label is created to represent SDR data, it is given a globally unique name. Thus, by design, SDR labels are globally unique and data can be referred to simply using its SDR label. A key property of the overall system is that the label-to-data mapping is reliably maintained somewhere in the system for the duration that the label is in use.

Figure 7:
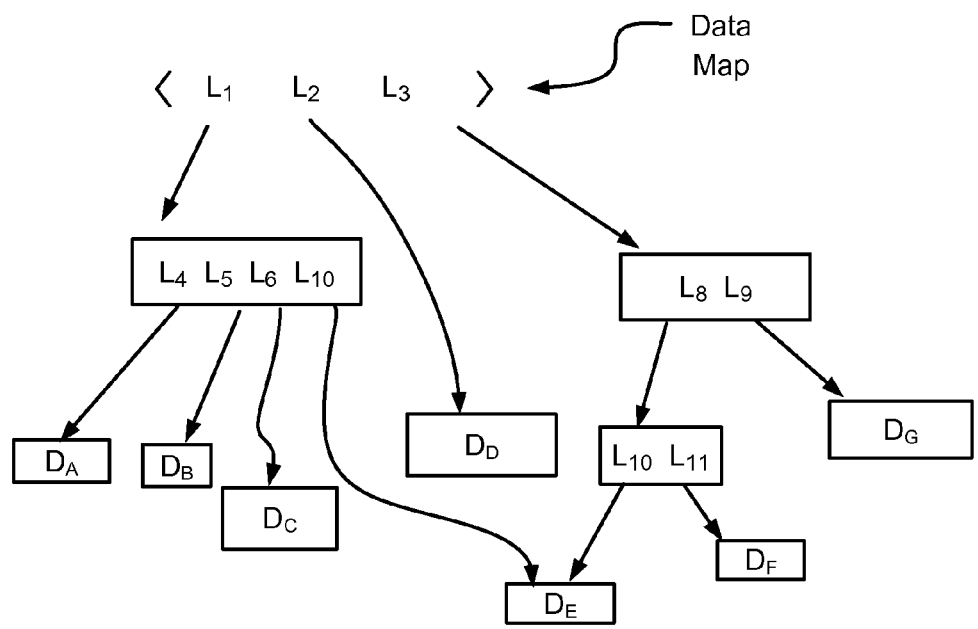
FIG. 7 illustrates how a data map can be built using an SDR hierarchical structure.

FIG. 7 illustrates how a data map can be built using the hierarchical structure of SDR. The entire data map is efficiently represented with only a small, "root" sequence of labels, in this example, <L1, L2, L3>. In turn, label L1 resolves to another sequence of labels, L4, L5, L6, L10. The resolution of a label to its representation can be carried out by a process that interrogates one or more SDR "segment stores", as described below. Continuing this example, label L4 resolves to data segment $D_A$, label L5 resolves to data segment $D_B$, and so forth. Note that label L10 appears in two distinct places in the hierarchy, illustrating the notion that the same data sequence can appear in multiple locations. In this fashion, the data map <L1, L2, L3> ultimately represents the data sequence $D_A D_B D_C D_E D_D D_E D_F D_G$.

Data Maps on the File System

In one embodiment, for each file in each SFS gateway file share, the corresponding data map is stored in a regular file on the backend filer. To realize this, the administrator of the SFS gateway defines the relationship between shares exported by the SFS gateway and each share on one or more backend file servers. For example, suppose the SFS gateway were called "fserver" and the backend file server were called "bserver". Further suppose there is a share on bserver called "S1", which contains a directory "D1", which in turn contains a file F. The operator might configure the SFS gateway to export another share called "DX" that is mapped onto //bserver/S1. Then, a user could mount //fserver/DX and access D1/F through that mount point, e.g., as //fserver/DX/D1/F. In other words, except for the contents of the files and perhaps some other control files, the file system that appears on the backend filer can be the file system that a client of the SFS gateway would see.

However, under this system, the contents of the files on the backend are data maps rather than the actual file data. Thus, when a client opens and reads a particular file through the SFS gateway, the SFS gateway opens the file on the filer backend, reads the contents, and interprets those contents as the data map. To reconstitute the data, an SFS gateway resolves each segment label in the data map using a segment store that it maintains reliably on stable storage. The segment store could also be stored on the backend filer in a special location, or it could be stored elsewhere.

Figure 9:
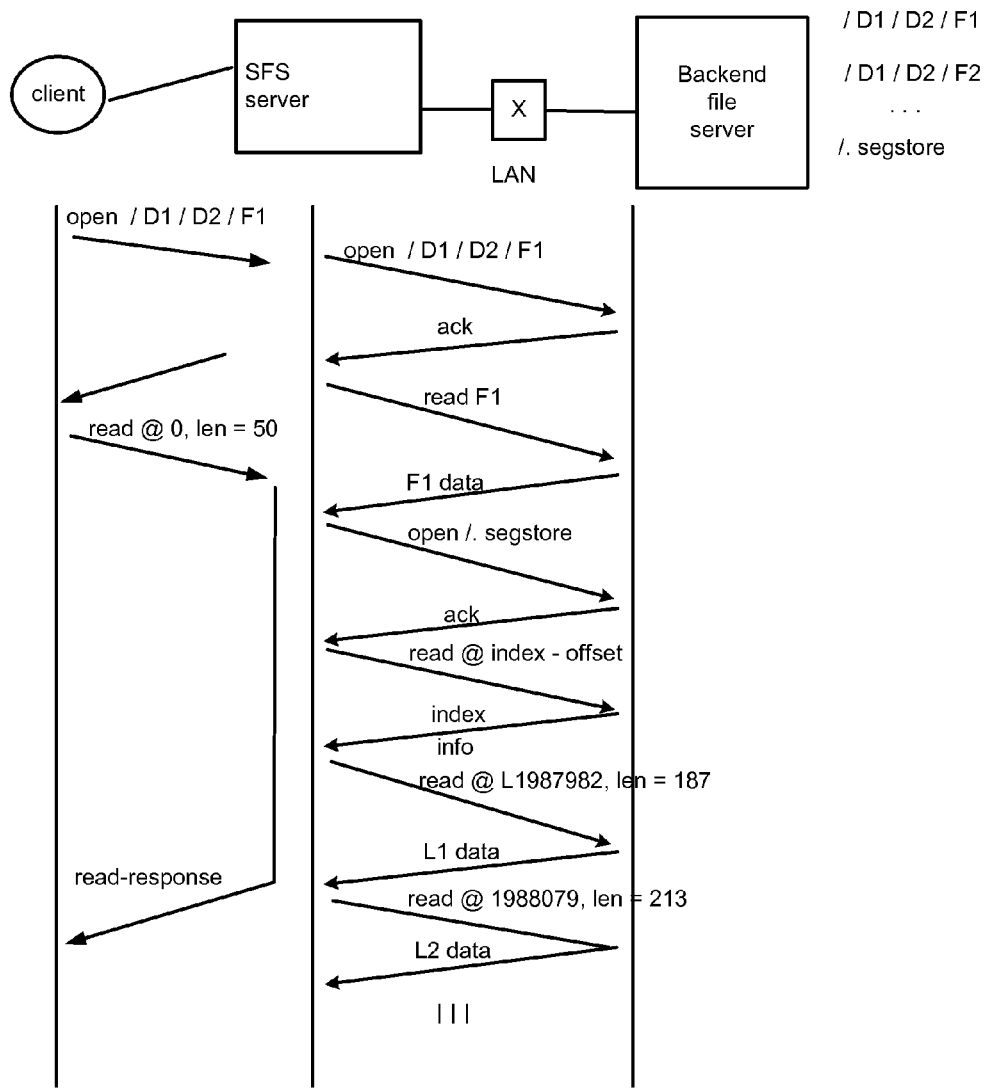
FIG. 9 illustrates a corresponding message flow.

This embodiment is illustrated at a high level in FIG. 8 and FIG. 9. FIG. 8 shows how a set of files F1, F2, F3, and F4 might be stored in a file system on an SFS server, in terms of the directory layout where D1, D2, and D3 are directory pathname components. In this example, the data for F1 is represented by the label sequence <L1, L2, L3>, meaning that a representation of <L1, L2, L3> is stored in the file F1 rather than the actual data. Likewise, sequence <L12, L7, L8, L9> represents and is stored in file F2, and so forth. In addition, a file called ".segstore" is stored in the file system representing the segment store. FIG. 9 illustrates a prototypical message flow between an SFS server situated on a LAN interconnected to a backend file system that stores the files. Other equivalent variations are possible.

With this model in place, as a client accesses a file over a CIFS connection to the SFS gateway, the SFS gateway reconstructs the file on the fly from the segment store and serves the client read requests with the reconstructed data. In FIG. 9, when a client accesses file F1, the SFS server opens that file on the backend file server, and reads the contents of the file, or portions thereof as required to interpret the data map corresponding to different parts of the file as the client accesses those different parts, perhaps in non-linear order. In this case, the SFS gateway does not serve those contents as the data of the file because this information represents the label string <L1, L2, L3> rather than the actual data. As such, the SFS gateway interprets the label string and resolves the labels to data using the segment store. To do so, in this embodiment, the SFS gateway opens the file ".segstore" and uses information stored therein to map segment labels to data. The layout of the segment store file includes various control information such as indices, reference counts, encoding information, and so forth that, among other things, allow the SFS server to determine where within the file the segment to data mappings are stored for the various labels. For example, an index might indicate that the data for label L1 is stored at offset 1987982 with length 187 so that the SFS gateway issues a read of the segment store file for that data as indicated. Likewise, label L2 may be located at offset 1988079 with length 213, resulting in an analogous read by the SFS gateway. Having resolved the label sequence to its underlying data, the SFS server can then respond to client requests for reading the corresponding data.

More generally, segments and indexing information may be laid out in the segment store file more efficient disk-based data structures like B-Trees, tables, and so forth. In other embodiments, segments may be grouped together into larger aggregates that are read in or written out to disk efficiently as a large unit. Each segment may also contain a reference count that reflects each use in the file system so that when the reference count becomes 0, then system may purge the segment from the file or disk and reclaim the space to be used by other segments that are actively in use. Other variations are possible wherein the segment store is split across multiple files, possibly located in multiple directories on the backend file server, perhaps where files are arranged according to when segments were last added to each file instance.

Continuing the example of FIGS. 8 and 9, when the client modifies a file, i.e., by issuing CIFS write requests, the changes made to the file must be reflected in the file's data map and any new segments encountered and created must be stored in the SFS store. In general, this problem of "encoding" the data into the SDR-based data map is a relatively difficult problem because comparing the new data against all the existing segments stored to see if there is a pre-existing match is complex. Rather than burden the SFS gateway with this complexity, in one embodiment, the SFS gateway instead re-uses a mechanism that already exists within a WAN accelerator for performing the encoding function. As such, when an SFS gateway processes new data from a client, it sends the data over the LAN to an adjacent WAN accelerator, which in turn, computes a data map and returns that data map to the SFS gateway. The SFS gateway then updates the data map for that file and adds any new necessary entries to the SFS store (and deletes any old ones that are no longer in use, or schedules a cleanup process to delete unused entries later). Because all of the entities in the system utilize globally unique labels when creating segments, it does not matter which entity or when segment labels are allocated. Thus, the SFS gateway can rely upon the WAN accelerator to allocate a label hierarchy to sequences of data and it focuses on the problem of organizing that the corresponding file data into data maps stored as files and a segment store stored persistently on disk to map the data maps back to the file data.

Figure 10:
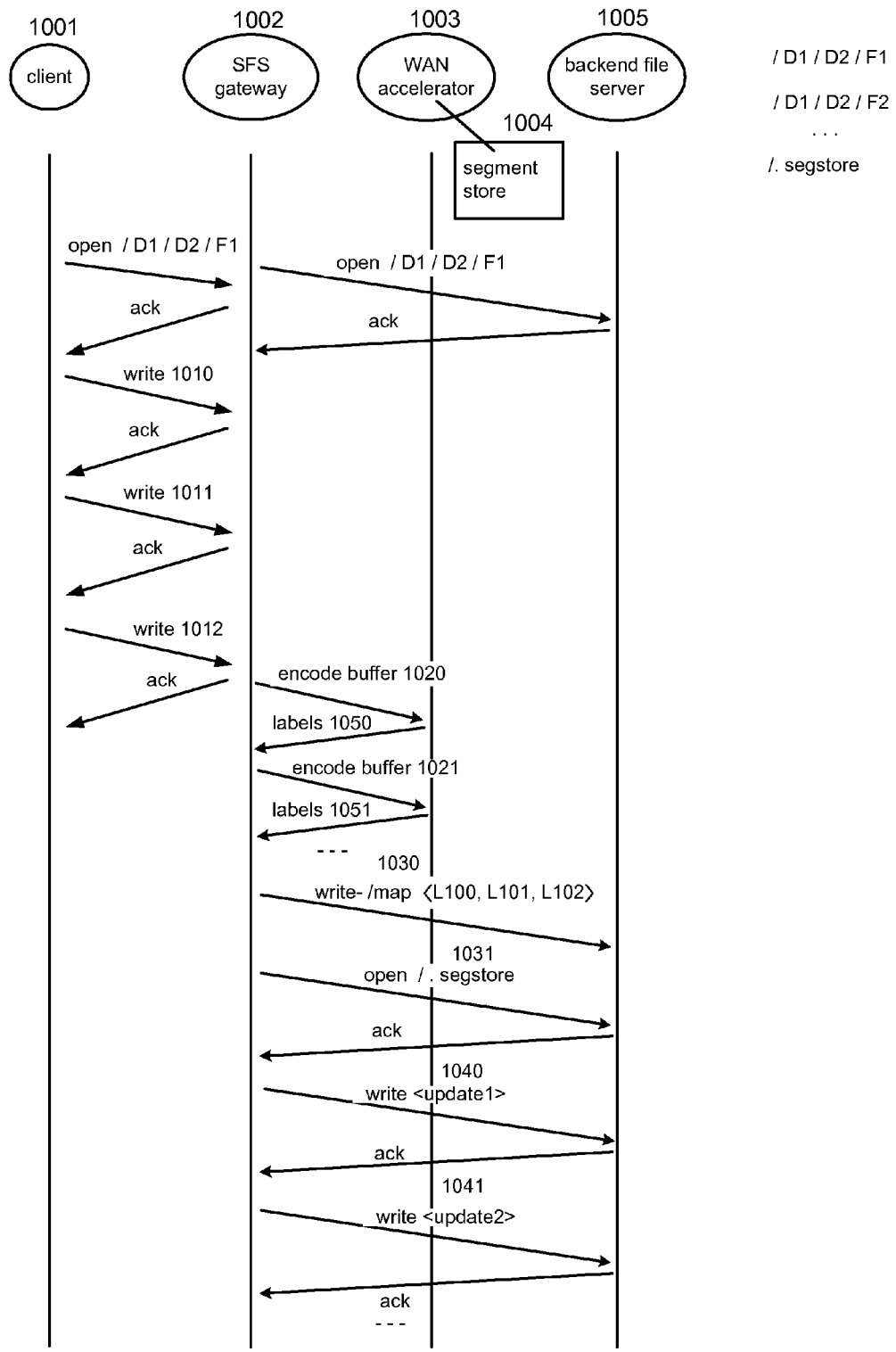
FIG. 10 illustrates another message flow.

This process is illustrated in FIG. 10. Here, a client 1001 opens file /D1/D2/F1 via the SFS gateway. When this occurs, the SFS gateway 1002 in turn opens the corresponding file on the backend file server 1005. In this example, client 1001 then writes data to the file as a sequence of write operations as shown as the writes 1010, 1011, and 1012. The SFS gateway collects up the data written and rather than writing that data to the backend file server, it transmits said data to an accelerator via requests 1020 and 1021. These requests result in the WAN accelerator mapping the data to SDR labels using its own local segment store 1004. As a result the label sequences are returned in messages 1050 and 1051. Using this information, the SFS gateway then writes the label to file F1 on the backend file server via request 1030. Finally, the SFS gateway must ensure that all of the label mappings are persistently stored in segment store in the backend file server. Thus, in this example, it updates the segment store by opening the /.segstore file on the backend file server via request 1031 and writes updated data structures reflecting any new segments encountered via requests 1040 and 1041.

While these example illustrates a sequence whereby the segment store file is opened each time it is accessed and/or update, in other variations the SFS gateway maintains one or more persistent file system connections to one or more files representing the segment store on the backend file server. In this fashion, whenever labels need to be queried or resolved, or whenever new segments need to be entered into the segment store, the SFS gateway can use the persistent connections to readily submit file system requests that serve these purposes. Likewise, in other embodiments performance can be optimized by pre-fetching and caching the various data structures that represent the segment store in the memory of the SFS gateway thereby reducing the amount and/or frequency that requests must flow between the SFS gateway and backend file server. For example, once a label to segment mapping has been read, this binding can be stored in a cache in the SFS gateway's memory so that if later, the label needs to be resolved in context of a different file or a different user session, the resolution can occur without issue any file system traffic to the backend file server.

WAN-Based Access

While clients that access an SFS gateway directly over a LAN in a data center benefit from reduced storage requirements due to data deduplication, clients that access the SFS gateway through segment-oriented WAN accelerators over the wide-area further enjoy the benefit of improved network communications. In this scenario, a segment-oriented WAN accelerator and an SFS gateway need not intercommunicate with a legacy protocol such as CIFS, but can instead achieve much greater efficiencies by speaking the lingua franca of SDR data maps. When a client initiates a CIFS connection through a WAN accelerator to an SFS gateway, the WAN accelerator can be configured to detect the presence of SFS gateway in the CIFS session setup process. In turn, the WAN accelerator signals to SFS gateway its presence and its capability of speaking an alternative protocol. As a result, the SFS gateway and the WAN accelerator can immediately switch away from the CIFS protocol and replace their dialect with SFS or another protocol, preferably WDS-optimized and data-map aware.

Using SFS, an SFS gateway can transmit an arbitrarily large file effortlessly by simply sending the data map in place of the file. By comparison, in a system with WAN accelerators but no SFS gateways, the process requires more steps, more network resources, and more computational resources. Here, when a client opens a file and reads its contents, the server-side WAN accelerator reads the file data from the origin server, translates the data into SDR labels, and transmits those labels to the client-side WAN accelerator, which in turn, reconstructs the data and responds to the client's read requests. With SFS, on the other hand, the SFS gateway can simply transmit the data map to the client-side WAN accelerator without having to touch any of the data on the origin file server. This effectively transports a virtual representation of the entire file in a single wide-area round-trip time without explicitly moving any of the underlying data.

Figure 11:
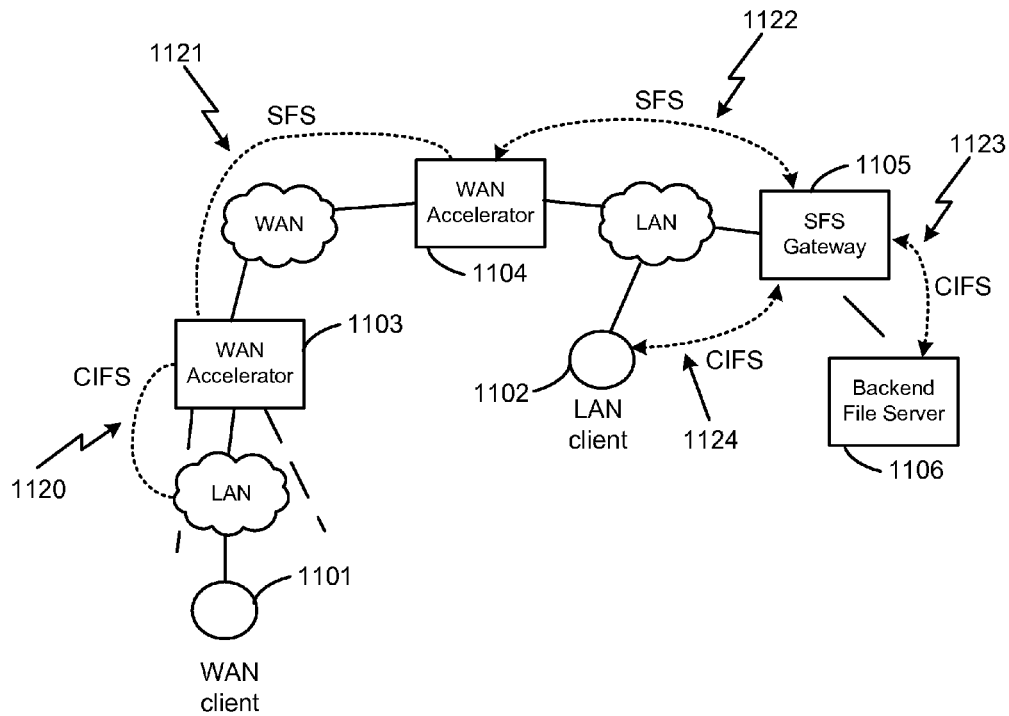
FIG. 11 illustrates operations for simultaneous WAN and LAN access.

This configuration is shown in FIG. 11. Here, a WAN client 1101 accesses the SFS gateway 1105 via a pair of WAN accelerators 1103 and 1104. The client simply uses an existing file server protocol like CIFS as its access protocol as depicted by connection 1120. In turn, the WAN accelerators utilize a second connection 1121 that exploits SDR and data maps embodied in the SFS protocol to carry file traffic across the WAN. Likewise, accelerator 1104 communicates directly with the SFS gateway using the SFS protocol.

When the WAN client opens and accesses a file across the WAN, communication via SFS is very efficient. Here, the entire file or very large pieces of the file can be transmitted efficiently as a data map from the SFS gateway though the accelerator 1104 and on to accelerator 1103. Once the data map has reached the client-side WAN accelerator 1103, it can be reconstructed by re-using the mechanism that the WAN accelerator already has in place for encoding and decoding SDR data. More specifically, the WAN accelerator interprets the SDR labels in the data map against the SDR segment mappings in its local segment store to reconstitute the original file data. Because SDR labels are globally unique, if the label is present in the local segment store, there is no reason to retrieve the label in the persistent label store maintained on the backend file server. Only the labels that are not present in accelerator 1103's segment store need be transmitted over the network.

More specifically, as the client issues read requests with respect to this open file, the WAN accelerator takes on the server's role for that file and answers the client requests locally, thereby providing high performance file access. Unlike a network cache, the file is transported in its virtual representation to the client-side WAN accelerator rather than stored in a local cache and checked for consistency with the original copy at the server. As part of this transportation process, if the client-side WAN accelerator encounters a label in the data map that is not present in its local segment store, it sends a resolution message using SFS through the server-side to the SFS gateway. The SFS gateway responds with the label-to-segment data mapping information allowing the client-side WAN accelerator to proceed with converting the data map to the underlying file data. Such resolution messages can be sent in parallel so a large number of missing segments can be resolved in a single round trip.

With this approach, the bandwidth limitations of the WAN are overcome because file data is reconstituted from the local segment store and latency impairments of the WAN are dealt with because the client-server interaction occurs locally between the file system end client and the client-side WAN accelerator over the local area network.

Figure 12:
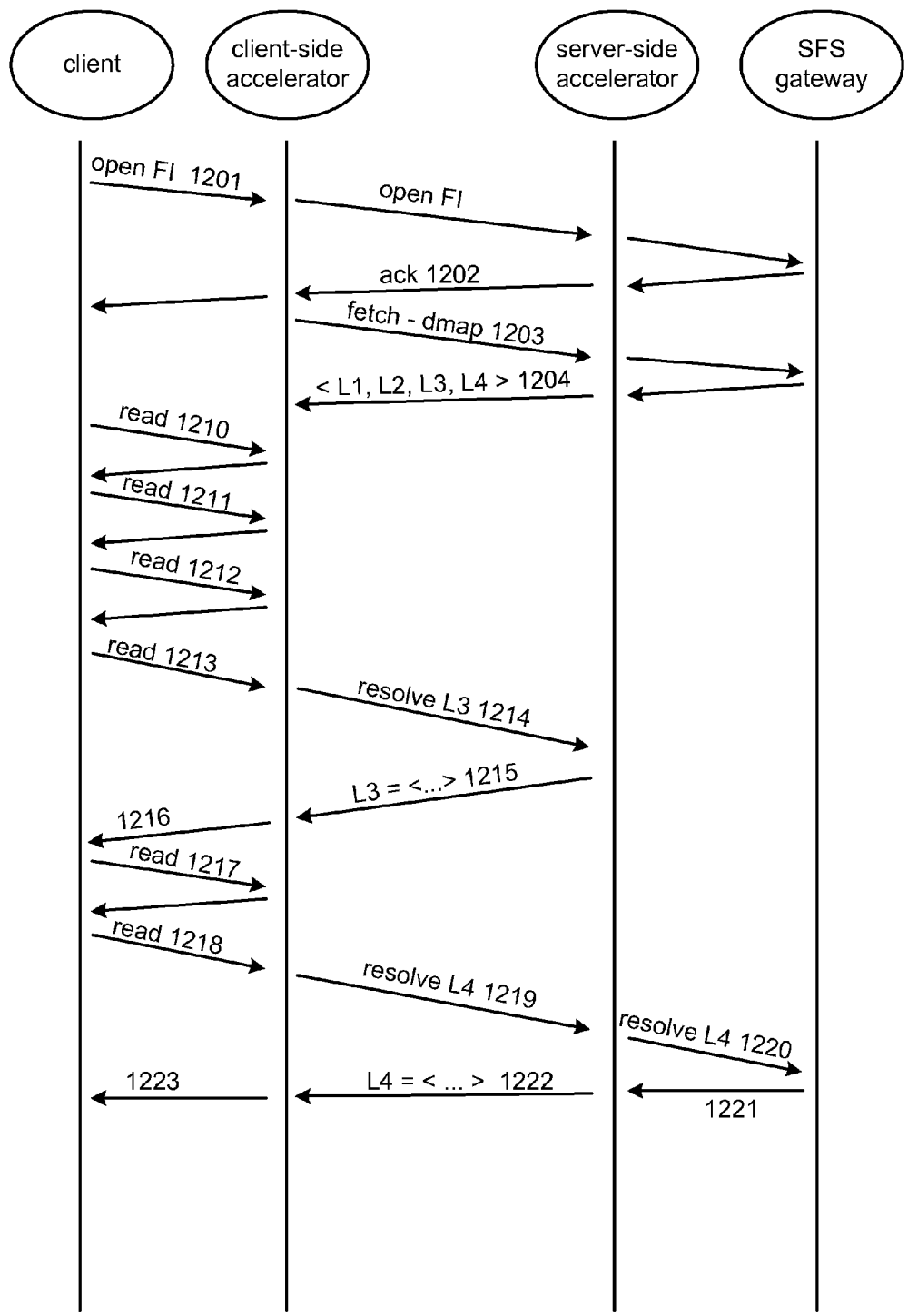
FIG. 12 illustrates an example process of a client reading a file from the SFS server and labels being resolved both locally and remotely.

FIG. 12 illustrates the process whereby a client reads a file from the SFS server and labels are resolved both locally and remotely. Here, the client opens a file F1 with request 1201. When the SFS gateway acknowledges the open via message 1202, the client-side accelerator issues a request 1203 to fetch the data map for the file. In response, the SFS gateway reads the data map off the backend file server (not shown) and transmits the label map to the client-side accelerator via message 1204. Here, the data map is represented as the label sequence <L1, L2, L3, L4>. In this example, the client-side accelerator is assumed to have a segment mapping for labels L1 and L2 (and all segments underlying those segments in the hierarchy). As such, as the client issues read requests 1210, 1211, and 1212, which correspond to portions of the file that are covered by labels that are locally known, the client-side accelerator reconstructs the data from the labels and its local segment store and immediately answers the read requests as shown. However, at some point, the client issues a read request 1213, corresponding to a portion of the file that cannot be reconstructed from the local segment store because the mapping for label L3 is not known. In this case, the client-side accelerator sends a request message 1214 to the SFS gateway asking to send it the data corresponding to label L3, or in the case of a label hierarchy, to send it the recursive label sequence that corresponds to label L3. When the server-side accelerator sees message 1214, it notices that it can satisfy the request because it happens to have a binding for L3 in its local segment store and thus responds with message 1215. Upon receiving the data, the client-side accelerator then can respond to the client's read request with the proper data as depicted in message 1216. Likewise, the client-side accelerator responds to request 1217. Now, suppose request 1218 is for a portion of the file not covered by L1, L2, or L3, and the client-side accelerator must resolve the mapping for L4. It does so by sending a resolution request 1219 for L4 to the SFS gateway. This time, suppose the server-side accelerator also has no mapping for L4. In this case, the server-side accelerator forwards the request along as message 1220 to the SFS gateway. Finally, the SFS gateway receives the request and consults its own segment store for the mapping and responds with message, which is in turned forwarded by the server-side accelerator to the client-side accelerator as message 1222. At this time, the client-side accelerator has the data it needs and can respond to the read request 1218 with response message 1223.

Other variations are possible in this configuration. For example, the data map could be fetched simultaneously with the file being opened so there is only a single wide-area round-trip to retrieve the open file map. Likewise, rather than having the client-side accelerator retrieve unknown segment mappings on demand only when they are needed by the client, the accelerator could pre-fetch them in anticipation of the client issuing one or more requests related to the file range in question.

As long as the SFS gateway guarantees that it maintains in its segment store any label that it serves in a data map of an open file, the system will correctly function because the accelerators can always ultimately ask the SFS gateway to resolve any unknown references. Toward this end, in one embodiment the SFS gateway maintains such a guarantee by reference counting each segment that appears in any file, inclusive of any other segments reachable by the transitive closure through the segment hierarchy, on the backend file server. When a file is deleted, the reference counts of all segments reachable from that file are decremented. When a file is added, the reference counts of all segments reachable from that file are incremented. When a file is changed, the reference counts of segments that are removed from the file are decremented and the reference counts of segments that are added to the file are incremented. When reference counts become zero, the space associated with the segment can be reused for other segments. In another embodiment, reference counts need not be explicitly maintained and instead a garbage collection algorithm is employed to detect when segments are no longer needed and can be freed up.

When a client changes a file by issuing write requests with respect to an open file, the client-side WAN accelerator incrementally computes a new data map to represent the changed file. As the file is modified by the client, the data map is updated to reflect the new content of the file. As new data is encountered, the new SDR segment mappings for the new data can be stored reliably in a scratch area on local storage within the WAN accelerator. Ultimately, when the client closes the file, the client-side WAN accelerator uses SFS to transmit the new data map, representing the modified file, through the server-side WAN accelerator to the SFS gateway. In other words, the entire file is synchronously committed to the SFS gateway in (typically) a single round trip by efficiently transmitting the new data map across the network. After the SFS gateway stores the data map reliably on the backend filer, it sends an acknowledgement message back to the client-side WAN accelerator. At this point, a coherent representation of the file has been written safely to the origin file server.

Even though the file map has been safely written through SFS gateway to the backend filer from the edge of the network, the data map might include SDR labels that the SFS gateway has not previously seen and are thus unknown. For each such label, the SFS gateway can retrieve the segment mapping via SFS from the client-side WAN accelerator. As these mappings are transmitted from the client-side WAN accelerator to the SFS gateway over the WAN, the client-side WAN accelerator can release them from its local scratch area of stable storage knowing the data is safely stored within the SFS gateway.

Figure 13:
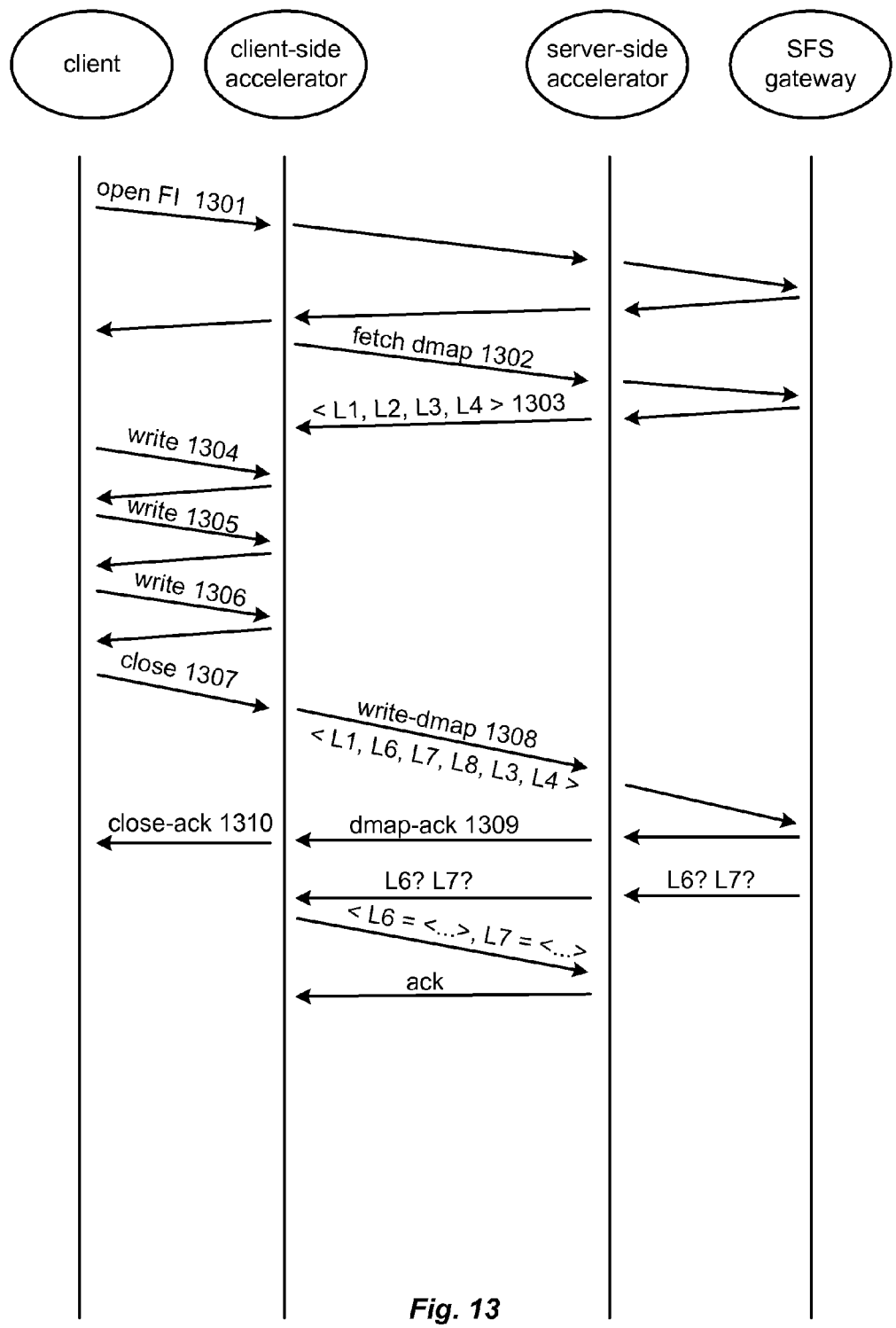
FIG. 13 illustrates a flow for opening and modifying an SFS file.

One embodiment of a process involving SFS, wherein a client opens and modifies a file, is shown in FIG. 13. Here, the client opens file F1 via request message 1301. As in the earlier example, the client-side accelerator fetches the data map for F1 via message 1302. The SFS gateway responds with message 1303 depicting a data map comprising the label sequence <L1, L2, L3, L4>. The client then issues various writes via messages 1304, 1305, and 1306. The client subsequently closes the file via message 1307. Before the close request can be acknowledged, the client-side accelerator must ensure that the file is safely written to the file server. Toward this end, the client-side accelerator computes a new data map for the file representing the changes made by the client, which in this example, is represented by the label sequence <L1, L6, L7, L8, L3, L4>. Note that the client effectively changed the area of the file that was previously represented by label L2, which resulted in L2's replacement with labels L6, L7, and L8. Further suppose for this example that L8 is already known to the SFS gateway, but L6 and L7 are not. As such, the client-side accelerator sends a request 1308 to the SFS gateway to write the data map to the file, and subsequently, the SFS gateway safely stores the data map on the backend file server (not shown). Once the data map has been safely stored, either by writing it to stable storage, or by storing the transaction in a crash-recoverable non-volatile log or other technique, then the SFS gateway acknowledges the data map write operation with message 1309. Knowing that the integrity of the file has been safely and consistently updated, the client-side accelerator acknowledges the close request with message 1310.

To ensure consistency of data and allow for crash recovery, the SFS gateway maintains a log of segment mappings that are pending at the SFS gateway. These pending segments represent the set of segments that are in data maps stored on the backend server but are not yet in the segment store on the backend server because they have not yet been transmitted from the device that allocated them to the SFS gateway. If the SFS gateway crashes before such transmission is complete, then upon recovery, the SFS gateway must consult its log and re-establish contact with the device that maintains the mapping. Moreover, the device with the not-yet-transmitted mapping must hold on to that mapping until the SFS gateway eventually receives it.

In one embodiment, these consistency semantics are implemented as follows. Whenever an accelerator writes a data map to an SFS gateway, the accelerator stores in stable storage a mapping of all the segments in the data map and marks those segments as being committed to the particular SFS gateway. This act of writing a data map is called a data-map commit operation. To implement the commit semantics, the accelerator guarantees that it will hold all of the mappings in the committed data map until they have been acknowledged by the SFS gateway. At any given point in time, there may be multiple SFS gateways to which a segment is committed and the segment mapping is maintained persistently by the accelerator until all the committed-to SFS gateways acknowledge the segment in question.

When the SFS gateway receives a data map, it writes the data map to stable storage and traverses all the labels in the data map to ensure that it possesses a mapping from each label to its data. Before acknowledging that the data map has been successfully written, the SFS gateway saves identification information for the device that committed the data map so that any unknown segments can be resolved from that device. Then, after acknowledging the commit, the SFS gateway updates the segment store to reflect the labels in the data map. For each such mapping it possesses, it sends an acknowledgement message to the accelerator, allowing the accelerator to free up the mapping it has retained for the corresponding label. In this case, the accelerator might decide to hold on to the mapping for other reasons, but it can mark it as dispensable so that it can be later deleted to make room for other mappings. For each mapping that it does not possess, it sends a request to the accelerator to resolve the unknown mapping. Once resolved, the accelerator can mark the mapping as no longer pending.

In the meantime, while this process is occurring, another client may open the file from another location in the network through a different accelerator. In this case, neither the new accelerator nor the SFS gateway for sure possesses all the mappings necessary to resolve the entire file for the new client. As such, the SFS gateway blocks any read requests that overlap with missing data until the data arrives via the resolution process described above. One way to optimize this scenario is to have the SFS gateway prioritize the order in which segment mappings are resolved such that mappings that correspond to data needed for pending client requests are given priority over mappings that are being requested simply to update the SFS gateway's segment store and for which there are no pending client requests. In this way, any pending client requests for data can be satisfied as quickly as is feasible.

More generally, a data map on the SFS server may have unresolved labels that are stored at multiple different accelerators located in different parts of the network. This can happen if different clients access and modify different parts of the file. For example, a first client might modify the front part of a large file through a first accelerator and a second client might modify the non-overlapping back part of the same large file from a different place in the network through a second accelerator. Then after both clients close the file, there may be a period of time while the segment mappings for the front part of the file are being transmitted from the first accelerator to the SFS gateway while at the same time the segment mappings for the back part of the file are being transmitted from the second accelerator to the SFS gateway.

While this is occurring, the SFS gateway might keep track of precisely which accelerator has what segments, and stores this tracking information consistently in stable storage, so that if a crash occurs, the SFS gateway can recover from the crash a resume the process of retrieving the pending segment mappings from the two accelerators. This case of two accelerators can be extended to an arbitrary number of accelerators by tracking, in general, the accelerator identity or address for each pending segment at the SFS gateway. Moreover, while the resolution process proceeds, a new client can open the file and modify it as the data map is globally unique and eventually resolvable and thus provides a clean separation between the underlying data comprising a file and the structure of the file itself embodied in the data map.

Cross-Protocol Benefit

Figure 14:
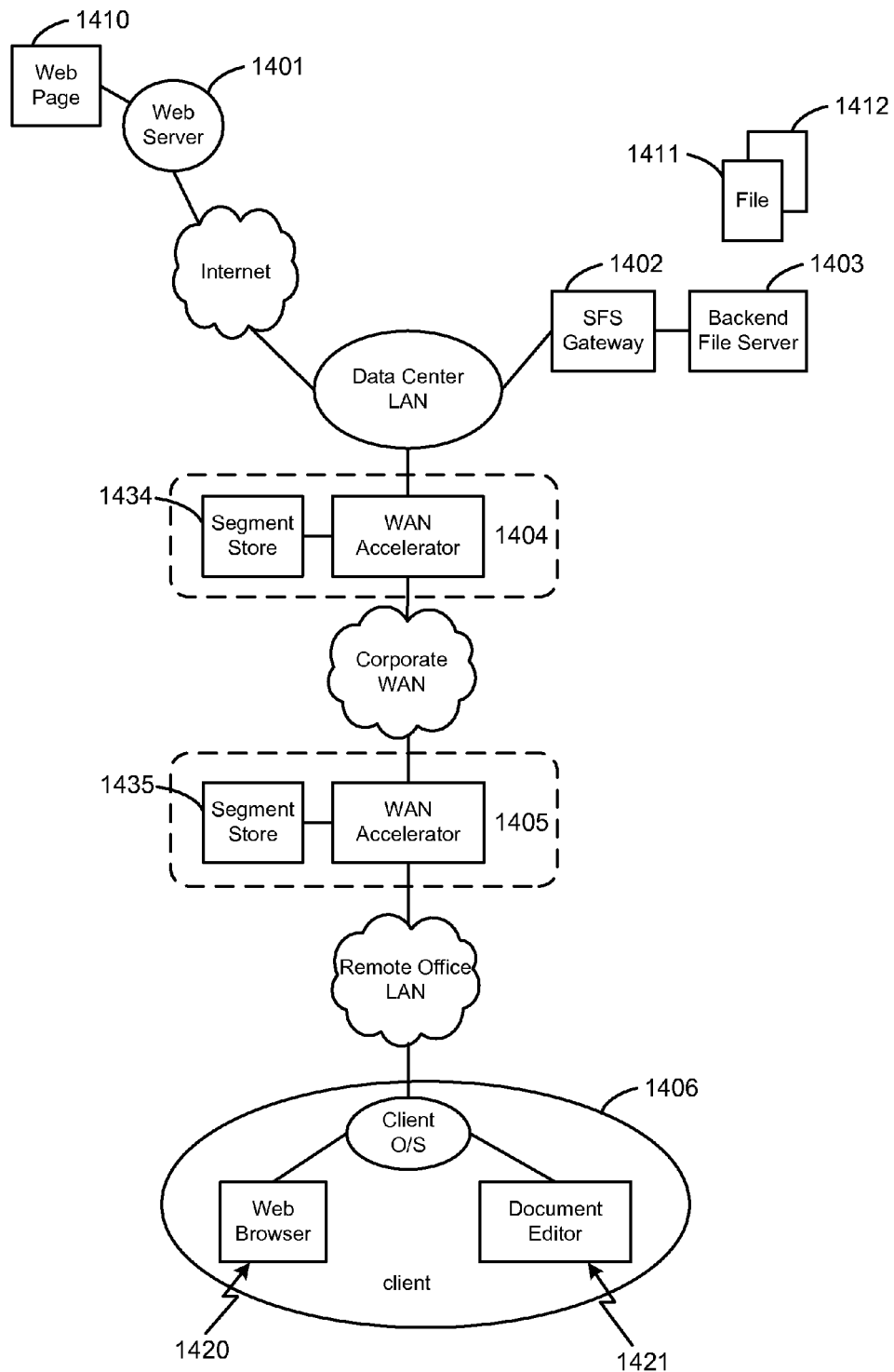
FIG. 14 illustrates an example network and network elements showing interoperation of an SFS gateway and an SFS-aware WAN accelerator.

Now that several embodiments of an SFS gateway have been illustrated, in particular, with respect to how an SFS gateway and an SFS-aware WAN accelerator interoperate, the benefits of such integration become apparent. FIG. 14 depicts a network that can be used to exemplify such benefits. In this example, a user edits a document that is stored on a file server managed by an SFS gateway. The user obtains content off of the Internet via a Web browser and that content is copied into the document. Even though the protocol used to access the Web data is totally unrelated to the SFS file server protocol, benefits accrue because data is shared among the application protocols across connections within the SFS-aware WAN accelerators.

To illustrate this in more detail, suppose a user at client 1406 opens a document in a document editor 1421. The document is fetched using the CIFS remote file access protocol across the network from the SFS gateway 1402. The SFS gateway in turn fetches the data map for the file 1411 from the backend file server 1403. Assume the data map is represented by the labels <L1, L2, L3, L4> and these labels correspond to data patterns D1, D2, D3 and D4. Note that a hierarchy of intervening labels may be interposed between each root label and each data pattern, e.g., whereby label L1 in turn refers to labels L11, L12, L13, which in turn refers to data patterns D11, D12, and D13, wherein D1 is comprised of the concatenation of D11, D12 and D13, and so forth for the other labels. Eventually, the data map is delivered to WAN accelerator 1405, e.g., using the process described above. At this point, the data is served to the client from the WAN accelerator 1405 via CIFS and the segment store 1435 has been populated with segment mappings for all of the labels that comprise file 1411.

Next, the user manipulates a Web browser that opens an HTTP connection from client 1420 to Web server 1401 and fetches Web page 1410. Incident to this transfer, WAN accelerators 1404 and 1405 intercept the Web connection and perform SDR encoding on the transfer. As part of this transfer, the Web data fetched are represented by label sequence L20, L21, L22, L23 representing data patterns D20, D21, D22, and D23. Now, suppose that the user manipulates the Web browser and document editor such that the fetched object is "cut" form the Web browser and "pasted" into the document editor. Further suppose the data cut and pasted in this fashion corresponds to the concatenation of data patterns D21 and D22 and that data now appears interposed between data patterns D2 and D3 of the original document. In general, the likelihood that a user-defined cut-and-paste would fall perfectly upon data patterns in this fashion is low and such an insertion of data would involve a more complicated pattern of new segments and boundary modifications. However, for the purposes of illustration, this simplified alignment is assumed.

Finally, the user saves the document, which now comprises the data patterns D1, D2, D21, D22, D3, D4. Subsequently, the client writes the data to the CIFS connection, which is then aggregated at WAN accelerator 1405. At this point, accelerator 1405 computes a data map for the modified file using SDR. In doing so, segment store 1435 indicates that pattern D1 is represented by label L1, D2 by L2, D21 by L21, D22 by L22, D3 by L3, and D4 by L4. Thus, the modified data map is determined to be <L1, L2, L21, L22, L3, L4>. This modified data map is then transmitted from accelerator 1405 to accelerator 1404, which in terms transmits the data map to SFS gateway 1402. At this point, SFS gateway writes the data map to persistent storage on the backend file server using techniques described earlier. However, the SFS gateway does not have mappings for L21 and L22. Thus, it sends resolution requests for those labels to accelerator 1404. At this point, accelerator 1404 inspects its segment store 1434 and finds the mappings, as they had been previously established by the original transfer of the Web date from the Web browser on the Internet through the accelerators and to the end client. Thus, accelerator 1404 responds with the segment data for L21 and L22, precluding the need to transmit data that had otherwise never been seen by the SFS protocol from the end client to the SFS gateway. This illustrates the performance benefits that occur across protocols due to this architectural approach.

As a further variation of this example, the accelerator 1405 decides to group the newly formed sequence of labels <L1, L2, L21, L22, L3, L4> into another layer of hierarchy before transmitting it on to accelerator 1404. Here, accelerator 1405 defines L31 as <L1, L2, L21> and L32 as <L22, L3, L4>. Then the data map for the document is represented simply as <L31, L32> and this new data map is transmitted from 1405 to accelerator 1404, and eventually written to the back end file server by the SFS gateway. In this case, the SFS gateway notes that it has no mappings for L31 and L32, and sends resolution requests for them to accelerator 1404. In turn, accelerator 1404 has no such mappings and sends them on to accelerator 1404. At this point, accelerator 1404 has the mappings and returns the data, i.e., the relationships between L31 with <L1, L2, L21> and L32 with <L22, L3, L4>. In turn accelerator 1404 delivers the mapping to the SFS gateway. Now, the flow of events is as before when the SFS gateway sends resolution requests for L21 and L22 to accelerator 1404 and accelerator 1404 is able to answer those requests.

File Bouncing

The means by which an SFS gateway temporarily transmits a file to the client-side WAN accelerator via its data map and back when the file is closed is referred to herein "file bouncing" as the file bounces to the edge when in use and bounces back to the safety of the source (such as a data center) when closed. By virtue of an elegant separation of the file's structure from its underlying data, this architecture permits synchronous file system operations to be carried out with extreme efficiency using the file map representation while heavy-weight data transport can occur asynchronously and in the background without impairing any file system semantics. In other words, file bouncing maintains the semantics and consistency of a file server while distributing its operation across the wide area in a unique way.

Because the file is essentially moved in its entirety to the remote site, the client-side WAN accelerator should be capable of performing the full range of functions and services of a file server. As such, the client-side WAN accelerator may include a core implementation of a file server to perform such functions. All activities associated with a bounced file can, in effect, be delegated to this embedded server, which acts transparently on behalf of the origin server. The embedded server is herein called a "delegate server".

In one embodiment, from the perspective of the client, the delegate server has the same IP address and server name as the SFS gateway and for all intents and purposes appears no different to the client than the SFS gateway except for its much higher performance across the WAN. This transparency affords a very attractive configuration model whereby any delegate server can act as a delegate for any SFS gateway without any explicit configuration. Since the client-side WAN accelerator already implements mechanisms to transparently intercept connections, the delegate server can easily act as a transparent end point for a file server connection. The three devices—the client-side WAN accelerator, the server-side WAN accelerator, and the SFS gateway—can all discover one another automatically, so there is no need to set up complex rules for how these devices are all to coordinate with one another, thus relieving an IT operator of a substantial configuration burden. In other words, any WAN accelerator can act as a delegate server for any SFS gateway automatically without requiring administrative configuration.

This transparency model is achieved, in part, with a novel security mechanism built into the system. By configuring a trust relationship between the delegate server and the SFS gateway, security information can be shared between the trusted devices to simplify deployment. One approach uses an architecture similar to that taught in Day I to enable SSL-based acceleration, but herein most of the examples show an approach adapted for file server communication.

For example, when a client performs authentication to establish a file server session, the client and server may agree to perform message signing and/or encryption for each message sent over the session. Since the client-side and server-side WAN accelerators modify the client-server payloads, effectively splitting the session between the two devices, end-to-end message signing and encryption cannot normally be carried out between the client and the server. Instead, after authenticating the session, the SFS gateway securely communicates to the WAN accelerators the private key for that session, thus enabling the client-side WAN accelerator to perform security functions such as signing and encryption with the end client on behalf of the SFS gateway.

Figure 15:
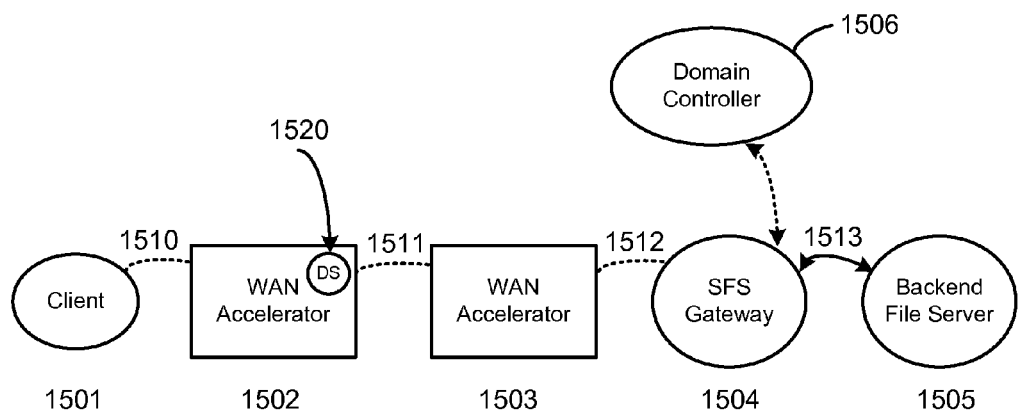
FIG. 15 illustrates secure SFS gateway communications with WAN accelerators.

This scenario is shown in FIG. 15. Here a client 1501 initiates a CIFS session by opening a transport connection 1510 to the SFS gateway 1504. The accelerators establish additional connections so that the session traverses transport connections 1511 and 1512 in addition to connection 1510. Client 1501 authenticates itself to the server using any of the various authentication mechanisms in CIFS. One such method involves Kerberos, whereby the SFS gateway 1504 exchanges messages with a domain controller 1506 to establish a private session key for the CIFS session. The SFS gateway then transmits the private session key, preferably using a secure communication mechanism, as is described in Day I, to accelerator 1502. In addition, the normal course of CIFS authentication distributes the private key to the client as well. Once all these messages have been exchanged, the client has been successfully authenticated with domain and the private session key is known to the client, the SFS gateway, and the accelerator 1502. In particular, the delegate server 1520 embedded in accelerator 1502 has been supplied the private session key and can perform secure messaging with the end client. For example, CIFS message signing often called "SMB signing" can be performed between the client and the accelerator 1502.

In another embodiment, the client's connection is terminated at the client-side WAN accelerator using the redirection mechanism that is part of the CIFS protocol, as is employed by Microsoft's Distributed File Server (DFS) protocols. In this scenario, the administrator configures the delegate server embedded in the accelerator as an entity with a name and address and configures the entity as a member of the trust domain. For example, in a Microsoft Windows domain, the administrator adds the delegate server's configuration information to the Windows domain controller. Unlike the transparent model above, in this approach, the client interacts with the delegate server explicitly using a different name and address, though at the user level, the mechanism is transparent as the user never sees the alternative name or address of the delegate. This is accomplished as follows. When the client initiates a connection to the SFS gateway, the client-side WAN accelerator can note that the client is attempting to establish a connection with an SFS gateway, e.g., either by embedding knowledge in the WAN accelerator as to which server end points are SFS gateways and which are normal file server end points, or by enhancing the session setup process to include additional information in the protocol messages that indicates to the client-side accelerator whether the server is an SFS gateway. Once the client-side accelerator determines that the client is initiating a connection to an SFS gateway the accelerator issues a CIFS referral pointing back to a server name and address that is an end point embedded within the client-side accelerator itself. In turn, this causes the client to initiate a new connection, directed not at the SFS gateway, but rather at the delegate server in the accelerator. At this point, the delegate server accepts the new connection and notes the relationship between this particular connection and the intended SFS gateway. If authentication is indicated to establish a private session key as part of the session establishment process, the delegate server carries out such authentication uses the standard protocol mechanisms and interacts with the domain controller as necessary to perform said authentication.

Having established how a client successfully establishes a secure file server connection with a delegate server embedded in a client-side accelerator, the concept of file bouncing can be explained further. When a file has been bounced to some location and then another client attempts to concurrently access that same file, an SFS gateway cannot bounce a second copy of the file to the second client location, as this would create consistency problems with the file system. Instead, in one embodiment, the SFS gateway forwards all file requests and responses associated with additional client accesses to the location of the delegate server for the already-open file. In this approach, all activity from a second site is forwarded to the first site via the SFS gateway. The downside of this approach is that the second site suffers the performance penalty of wide-area round trips. However, this is likely to be an unavoidable cost for allowing simultaneous access of multiple clients located at different network sites to a single instance of data, where modifications to that data might occur.

To implement file bouncing, the SFS gateway keeps track of the state of each file indicating whether it is locally present or if it has been bounced, and if so, to where it has been bounced. As described earlier, the SFS gateway also keeps track of whether segments are pending for a particular file and where those segments are located. This occurs when there is a new data map written to a SFS gateway but there are still segments referred to by that file at the delegate location which are not yet in the data store. In fact, as described earlier, as a file bounces about the network and is partially read and updated by different clients, there may be different segments for the same file outstanding at multiple past delegate locations.

To further enhance performance, an SFS gateway can be configured to allow a file to be bounced to multiple locations in cases where that file is being read but not modified. Since multiple copies of a file can become inconsistent only when modifications occur, this model allows high performance simultaneous access to multiple sites when files are being read but not written. Such a mechanism could be built upon information that is included in a client's file open request regarding whether the file is being opened for read-only or read/write access. However, it is often the case that an application opens a file for read/write access but never actually performs any writes. To deal with this scenario, file bouncing can use deeper intelligence whereby the system allows multiple concurrent delegates for a given file, even for read/write file access, and only until a client actually issues a write request on an open file does the system definitively conclude that the client is modifying the file. At this point, the system dynamically consolidates the delegates to a single location since modifications have been requested. In other words, instead of trying to move a modified bounced file around as different clients attempt to write the file at different points in time, a single bounced location is elected upon detection of the first write.

Figure 16:
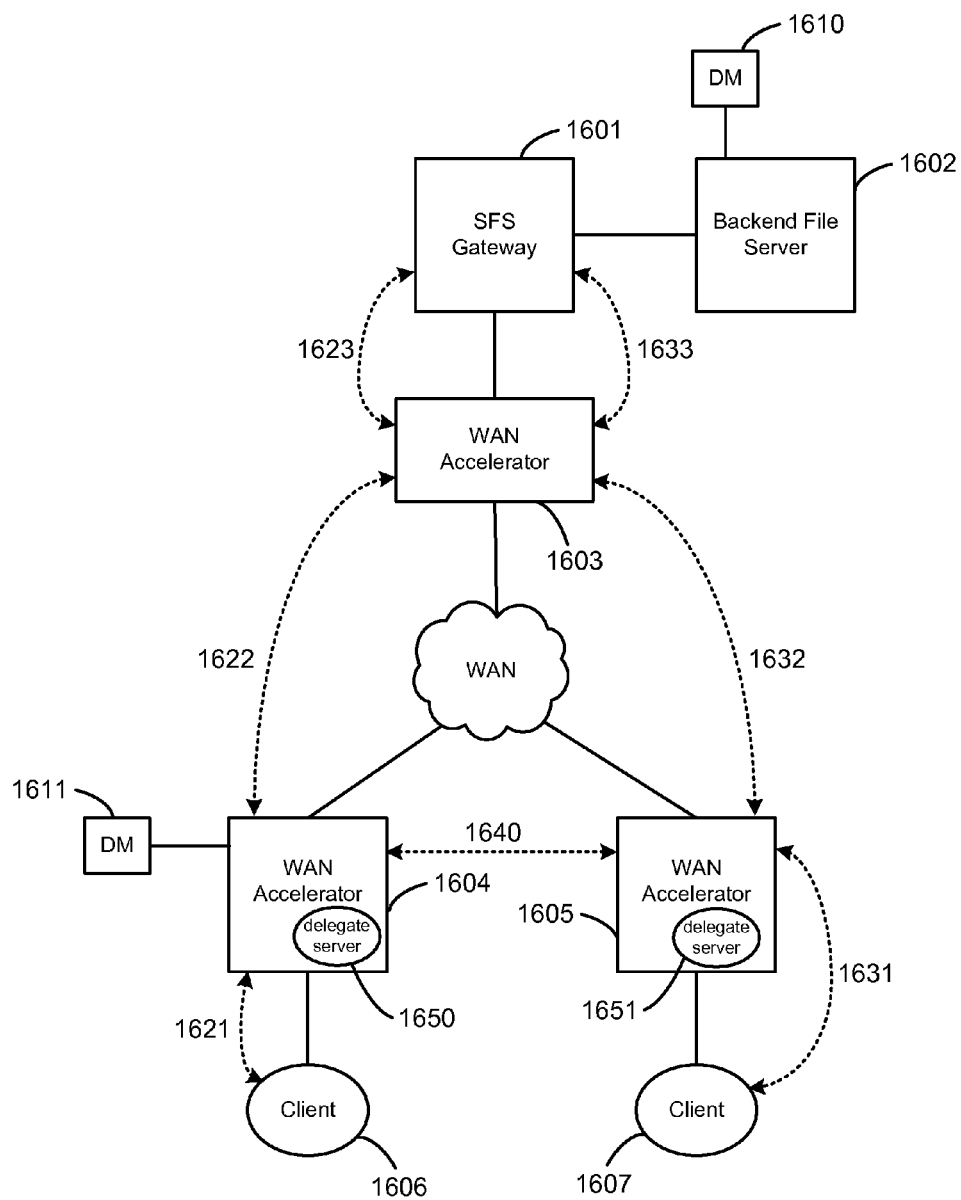
FIG. 16 illustrates an example of how file bouncing might occur according to methods described herein.

File bouncing in this fashion is illustrated in FIG. 16. Here, a client 1606 establishes a file server connection to an SFS gateway 1601 with backend file server 1602 via connections 1621, 1622, and 1623 incident to accelerators 1604 and 1603. Likewise, a client 1607 establishes a file server connection to SFS gateway 1601 via connections 1631, 1632, and 1633 incident to accelerators 1605 and 1603. Now, suppose client 1606 opens a file F represented by data map 1610. As described above, the data map is bounced to WAN accelerator 1604. In turn the delegate server 1650 embedded in accelerator 1604 handles file system requests issued by client 1606 with respect to the bounced data map 1611. Unlike a file cache, this system operates on the meta-representation of the file, via the data map, rather than a copy of the file data itself. The segment store and segment resolution mechanisms handle the mapping of the meta-representation to the actual data only on an as-needed basis.

This separation of data from the meta-representation a key attribute of the design as it makes concurrent file access at different locations far more efficient than alternative and traditional approaches based on file caching. This can be seen when another client in the network concurrently accesses an open file. Continuing the example, suppose client 1607 opens file F, which had previously been and is currently opened by client 1606. Since the data map 1610 has already been bounced to accelerator 1604 as data map 1611, the original data map 1610 may no longer be valid and cannot be relied upon. As such, the data map is not bounced to accelerator 1605. Instead when accelerator 1605 attempts to fetch the data map form the SFS gateway, the SFS gateway denies the request. At this point, all file requests related to the open file issued by client 1607 are transmitted to the SFS gateway rather than being handled locally by delegate server 1651. In turn, the SFS gateway forwards any file requests from client 1607 via accelerator 1605 to delegate server 1650. Delegate server 1650 then processes any such request, which it can certainly do since the file had been bounced to that location. Upon processing the requests, the results are then returned back to the SFS gateway, which then forwards these results back to accelerator 1605. Finally accelerator 1605 returns the results to client 1607. By representing the data comprising the requests as labels instead of the original data, the efficiency of the communication can be greatly increased. Thus, as client 1607 issues reads and/or writes to the file, those read and write requests are encoded as sequence of labels and only when the actual data is ultimately needed by an entity, does the label data need to be resolved. In certain cases, for example, when the two clients are operating on non-overlapping portions of the same file, the respective data never needs to be transmitted to the other site. It only needs to be transmitted ultimately to the SFS gateway.

In another embodiment, the performance of concurrent access as depicted in FIG. 16 is improved as follows. When client 1607 opens file F and accelerator 1605 attempts to retrieve the data map for that file, the SFS gateway denies the request as before, but then directs the accelerator 1605 to delegate server 1650 embedded in accelerator 1604, indicating to accelerator 1605 that the data map has been bounced to that location. As such, accelerators 1605 and 1604 establish a connection 1640 permitting direct communication. In this way, accelerator 1605 need not forward operations for the bounced file through the SFS gateway and can instead communicate directly with the delegate server 1650 embedded in accelerator 1604.

Disconnected Operation

If the network path between the SFS gateway and the bounced delegate becomes disrupted, then the second client is denied access for the duration of the network outage because file system consistency cannot otherwise be maintained. Unlike network caching systems, which often trade off consistency for performance, file bouncing provides perfect consistency semantics by occasionally sacrificing service availability. Moreover, by bouncing files to a delegate location on a first-come, first-served basis, the system provides performance priority to the client that first accesses the file. In another embodiment, other priority policies may be established by migrating the bounced location on demand in reaction to the scenario whereby a client with higher priority opens a file concurrently with an existing client of lower priority.

The desire to allow access in the face of network failures like this is often called "disconnected operation". However, if disconnected operation for a particular file is to be allowed at a particular remote site when the WAN is down, then data inconsistency can arise if another client accesses the file at an SFS gateway while a client at the unreachable site modifies the same file. The only way to avoid this problem is to deterministically deny access to all but one instance of a file when the network is down. It can then become a matter of administrative policy as to which site should be allowed to continue to function for a particular file, directory, file share, or volume in the face of network outages.

To enable this form of disconnected operations, the notion of file bouncing described above is extended to embody a semi-permanent mode of operation. In this approach, the administrator configures a file system object like a directory or a file share to be permanently bounced to a particular remote site. In this model, the operator configures the SFS gateway to designate the chosen set of files as being associated with a particular accelerator, or more specifically, as being associated with a particular delegate server embedded in a particular WAN accelerator. Then, the SFS gateway bounces the data maps for all of the files in the configured set to the configured location on a semi-permanent basis, i.e., until the system becomes configured differently. These files are called "sticky" as they remain in a given location, i.e., they are "stuck" to the configured location. As clients access the sticky files, the location of the data maps stay at the configured accelerator compared to the general scenario where the data map bounces to the location where it is used. So clients near that accelerator will always enjoy high performance while clients remote from that accelerator will generally receive lower performance. The performance of remote access is still accelerated by the WAN accelerators, but the overall performance is not as good as if the file bounced.

As a client access and modifies a file at a sticky location, the corresponding data map is replicated asynchronously back to the SFS gateway so the SFS gateway also has an accurate copy. This allows the sticky directory or sticky file share to be backed up easily and efficiently all within the data center without having to worry about backing up all of the sticky locations. To the administrator, for the purposes of backup and other similar administrative functions, the file system server looks just like a normal file server in the data center even though the system has effectively been distributed across all of the sticky locations. Likewise, if the file system needed to be restored for some reason, it could be restored all within the data center then the sticky locations would synchronize with the new data maps that have been restored. This restoration process would be efficient because the segment data underlying the restored files would not need to be copied to the sticky locations for those segments already present in the accelerator's local segment store.

By arranging for the data map to attach permanently to a location, files can be accessed and modified at that location even when the network is down without fear that any inconsistencies will arise. This is possible because the data map defines the master copy of the file and when the network goes down, only clients that have access to the sticky location can manipulate the file. All other accesses from other parts of the network are not possible since the network is down. This prevents consistency problems from arising.

Figure 17:
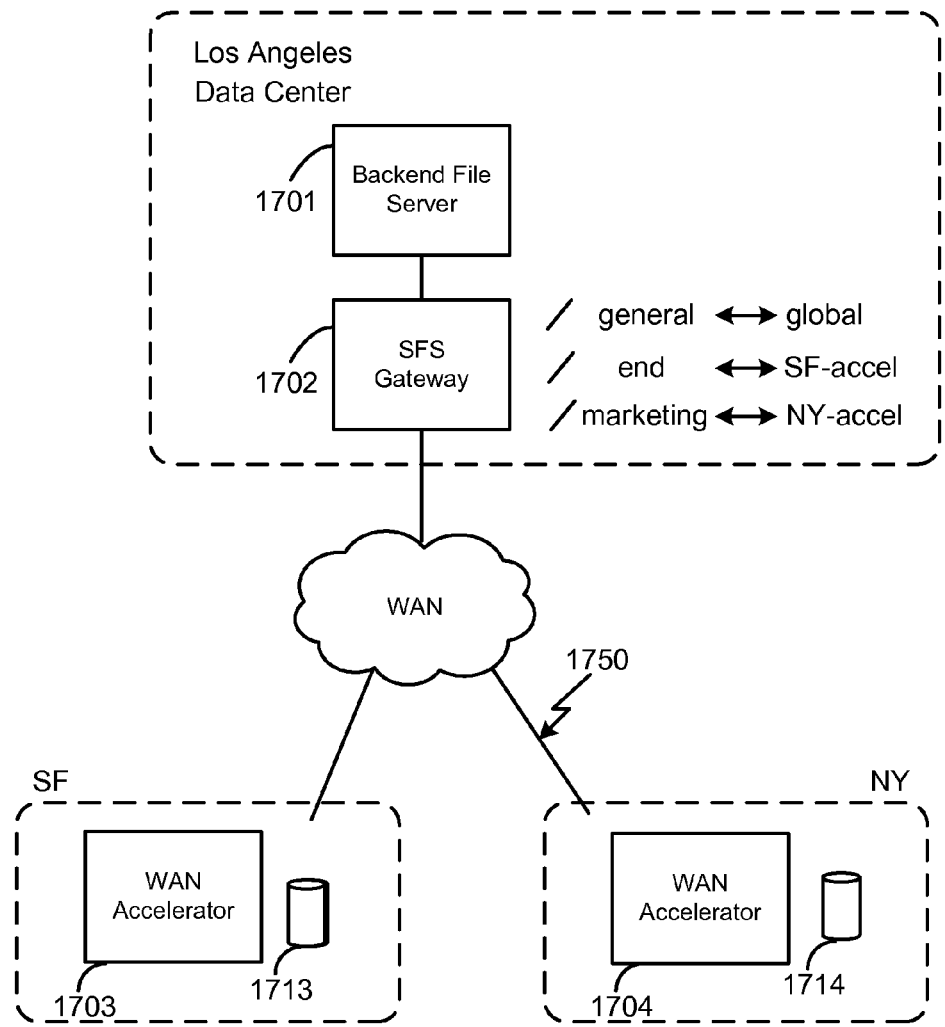
FIG. 17 illustrates and example of sticky file configuration.

FIG. 17 shows an example of how sticky files might be configured. In this example, the SFS gateway 1702 and backend file server 1701 are located in Los Angeles, while WAN accelerator 1703 called "SF-accel" is located in San Francisco and WAN accelerator 1704 called "NY-accel" is located in New York. In addition, accelerator 1703 includes local storage 1713 and accelerator 1704 includes local storage 1714. The operator configures the SFS gateway with the directive that files in directory "/general" and marked "general" meaning they are generally available under the file bouncing scheme described above; files in "/eng" are sticky to SF-accel, i.e., the San Francisco location; and, files in "/marketing" are sticky to NY-accel, i.e., the New York location. Such a policy would be consistent with a scenario in which the marketing team was located in New York and the engineering team was located in San Francisco. By making their respective files sticky to their location, each team would enjoy the maximum performance benefit and be able to continue to work on their files in the face of network continuity problems.

Continuing the example, when a client in San Francisco accesses a file in the /general directory, the file bounces to the San Francisco location. However, when that same client accesses a file in the /marketing directory, the file's data map does not bounce and instead the file is accessed as described earlier wherein the accesses are forwarded to the bounced location, in this case, to the accelerator 1704 in New York. In this case, the data maps for the files in the /marketing directory are stored in stable storage 1714 and replicated to the backend file server 1701. Likewise, if the client in San Francisco accesses a file in the /eng directory, then the data map is already bounced to accelerator 1703 and it is retrieved from storage 1713. Supposing a San Francisco client modifies and saves a file to directory /eng, the data map is then written to stable storage 1713 and replicated to the /eng directory on the backend file server.

With this scenario, the benefits of disconnected operation can be seen when, for instance, network link 1750 fails. In this case, users in San Francisco cannot reach the New York site and users in New York cannot reach the Los Angeles or San Francisco sites. However, because the /marketing directory is sticky to New York, the New York clients can continue to work on and manipulate files therein. Naturally, any attempts to access files in /marketing from San Francisco cannot function and thus the system will deny such accesses, as otherwise, the files would become inconsistent if updates were permitted on two distinct versions of the file. Later, when link 1750 is restored, any changes to the files in /marketing made by the New York clients are replicated back to the SFS gateway asynchronously and the system as a whole recovers without any file system inconsistencies.

In other embodiments, the concept of stickiness may include not just directories, but entire directory subtrees, arbitrarily defined sets of files, individual files, file shares, and so forth. The set of files defined could include arbitrary logic to identify said files by pattern matching of the file name or its attributes. In this way, a user or an application could set attributes on files to exert control over where and how the file is sticky to a given location.

In another embodiment, a sticky file might be made read-only when the sticky location for that file is inaccessible. One problem with such a capability, however, is that a user might access an out-of-date copy of a file and work on it resulting in wasted effort. To avoid such problems, in another embodiment, sticky files are made read-only when the sticky location for that file is unavailable but the access is made via an alternative directory path. For example, the system could present to the user a folder in each directory that maintains a sub-directory in each sticky directory that holds the most recent copy of unavailable files. In this fashion, if a user really wanted to access a possibly out-of-date, read-only copy of a sticky file, they could do so, but they would be explicitly aware of the fact that the alternate file could be possibly out of date.

Directory Bouncing

In addition to file bouncing, an SFS gateway can bounce directories. This allows a client to perform a verbose set of directory-oriented operations efficiently over the LAN between the client and the client-side WAN accelerator. For example, when a client manipulates many small files in a large directory, there is often a large number of synchronous directory updates to create files, rename files, delete files, and so forth. By bouncing the directory itself as a single entity to the client-side WAN accelerator, these operations can be performed very efficiently. If and when the directory has been modified, the new directory structure is bounced back to the SFS gateway from the client-side WAN accelerator by transmitting a "directory map", i.e., a data map representing the data structure embodying a directory. When the client has finished manipulating a bounced directory, the client-side accelerator commits the directory update back to the SFS gateway. Once the SFS gateway receives the new directory structure, it updates the corresponding directory entries on the backend filer.

As with file bouncing, consistency issues need to be avoided with respect to directory bouncing. In one embodiment, consistency is managed by keeping track of the location any given directory has been bounced to. Then, when a client attempts to browse or manipulate a bounced directory via operations incident to an SFS gateway, the SFS gateway implements such operations or browsing by interrogating the accelerator to which the directory has been bounced. For example, the various directory operations could be forwarded to that location and the results collected up and returned back to the client.

In another embodiment, consistency is maintained by having the SFS gateway maintain a locking protocol on any bounced directory. When a client-side accelerator wishes to bounce a directory, it requests a lock. If there are no other accesses pending, the SFS gateway grants the lock. If another client-side accelerator wishes to bounce a directory that has already been locked, the SFS gateway revokes the first lock and forces both client-side accelerators to operate against the shared directory structure maintained at the SFS gateway. This is similar to the way opportunistic locking works in CIFS but is applied to directory structures.

Efficient Volume Replication

The separation of the file structure from the underlying data creates a very powerful model for data replication. As storage systems have scaled to hold enormous amount of data, the processes for getting data into and out of storage systems and replicating that data quickly have become challenging and time consuming. In certain cases, it can take days if not weeks to replicate from one large storage system to another. This creates windows of large amounts of time while systems must be taken offline to allow such replication to occur.

However, a replication model based on SFS gateways can greatly facilitate this scenario. In this embodiment, the SFS gateway is extended with a replication capability, whereby the data maps of a first SFS gateway are replicated synchronously to a second SFS gateway, while the segment data is replicated asynchronously. Typically the data maps will be hundreds if not thousands of times smaller than the underlying file data. Thus, the data maps can be replicated hundreds if not thousands of times faster than the data.

Figure 18:
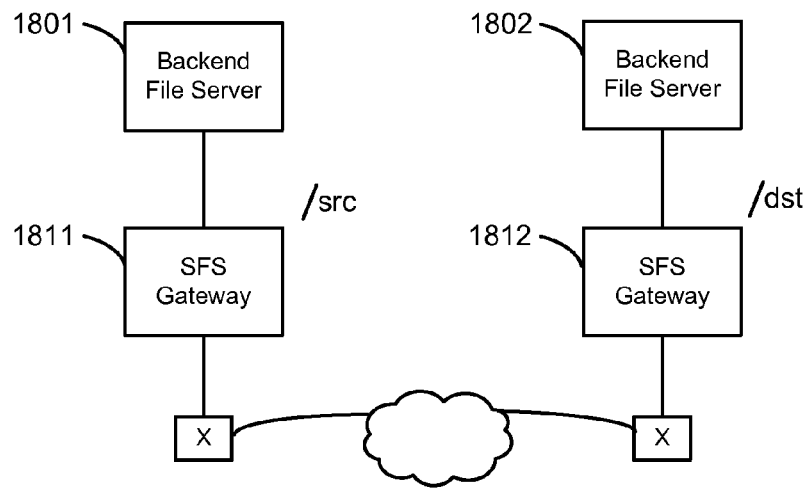
FIG. 18 illustrates components that might be used for data map replication.

This scenario is depicted in FIG. 18. Here, a first SFS gateway 1811 coupled to backend file server 1801 interacts with a second SFS gateway 1812 over a network. The administrator creates a replication job to copy of the files in directory "/src" on SFS gateway 1811 to directory "/dst" on SFS gateway 1812. To implement the replication job, all of the data maps in the /src directory are copied to the /dst directory. Along with each new data map in the /dst directory, the SFS gateway 1812 keeps track of the location where each file came from, in this case, SFS gateway 1811, but more generally there may be other possible locations when replication jobs are allowed to occur from arbitrary sources to arbitrary destinations. Once all of the data maps have been copied, clients can access the files either directly though the SFS gateway, or through SFS-aware WAN accelerators as described earlier. In the meantime, the SFS gateway 1812 scans all of the files that have been copied to locate segments that are not present in its own local segment store. For each such segment, it sends a resolution request for the segment to the SFS gateway that had previously sourced the data map, in this case SFS gateway 1811. Once all the segments are determined to be present, the process ends. If, during this process, a client attempts to access a file in the "/dst" directory for which SFS gateway 1812 does not have necessary segments present, the SFS gateway sends an immediate request to the gateway that had previously sourced the data map, in this case SFS gateway 1811. In this fashion, clients can access files that have been replicated via their data maps even when all the underlying data is not present because said data can be fetched from the source location on demand.

This process can be combined with snapshots and network-replicated snapshots (e.g., the "snapmirror" system provided by NetApp or other similar products) to create a particularly useful scenario. Here, the /src and the /dst directory represent directories that are replicated as snapshots over the network. Then, the snapshot facility of the backend file servers would copy the directories very efficiently and preserve point-in-time consistency. As each snapshot becomes available, the SFS gateway brings the segment store up to date by retrieving any segments that are present in the snapshot data maps but not present in the local segment store. This could be accomplished by the SFS gateway traversing all of the data maps in each snapshot, or more efficiently, by having the source SFS gateway communicate to the destination SFS gateway a list of only the changed data maps, and only these changed data maps would need to be scanned for new segments.

While the invention has been described with respect to exemplary embodiments, one skilled in the art will recognize that numerous modifications are possible. For example, the processes described herein may be implemented using hardware components, software components, and/or any combination thereof. Thus, although the invention has been described with respect to exemplary embodiments, it will be appreciated that the invention is intended to cover all modifications and equivalents within the scope of the following claims.

What is claimed is:

1. A non-transitory storage medium storing instructions that, when executed by a hardware-based WAN accelerator coupled between one or more LAN clients and one or more file servers separated from the one or more LAN clients by a WAN, cause the hardware-based WAN accelerator to perform a method comprising:
receiving write requests from a client that are write requests for a file resident on a file server;
converting the write request data into changes to a data map associated with the file and segments of data referenced by the data map, wherein the data map comprises a collection of names of the segments of data, and wherein the collection of names specifies at least some of the content stored in the file;
conveying the changed data map to the file server using a file server protocol and receiving an acknowledgement of the commit of the data map from the file server, wherein the file server stores the changed data map;
conveying the changed segments of data to the file server and receiving an acknowledgement of the commit of the changed segments of data; and
signaling to the client making the write requests or other LAN clients that the file has been committed to the file server, wherein the signaling occurs after receiving the acknowledgement of the commit of the data map from the file server, but before receiving an acknowledgement of the commit of the changed segments of data.

2. The non-transitory storage medium of claim 1, further comprising logic for providing a second client with the file being written by providing the data map from the file server and the segments of data from a local segment store.

3. The non-transitory storage medium of claim 1, wherein multiple occurrences of a given segment of data in a file is represented by multiple occurrences of the name of the segment of data in the data map associated with the file.

4. A method, comprising:
the hardware-based WAN accelerator receiving write requests from a client that are write requests for a file resident on a file server;
the hardware-based WAN accelerator converting the write request data into changes to a data map associated with the file and segments of data referenced by the data map, wherein the data map comprises a collection of names of the segments of data, and wherein the collection of names specifies at least some of the content stored in the file;
the hardware-based WAN accelerator conveying the changed data map to the file server using a file server protocol and receiving an acknowledgement of the commit of the data map from the file server, wherein the file server stores the changed data map;
the hardware-based WAN accelerator conveying the changed segments of data to the file server and receiving an acknowledgement of the commit of the changed segments of data; and
the hardware-based WAN accelerator signaling to the client making the write requests or other LAN clients that the file has been committed to the file server, wherein the signaling occurs after receiving the acknowledgement of the commit of the data map from the file server, but before receiving an acknowledgement of the commit of the changed segments of data.

5. The method of claim 4, further comprising providing a second client with the file being written by providing the data map from the file server and the segments of data from a local segment store.

6. The method of claim 4, wherein multiple occurrences of a given segment of data in a file is represented by multiple occurrences of the name of the segment of data in the data map associated with the file.

7. An apparatus, comprising:
a processor; and
a non-transitory storage medium storing instructions that, when executed by the processor, cause the processor to perform a method, comprising:
receiving write requests from a client that are write requests for a file resident on a file server;
converting the write request data into changes to a data map associated with the file and segments of data referenced by the data map, wherein the data map comprises a collection of names of the segments of data, and wherein the collection of names specifies at least some of the content stored in the file;
conveying the changed data map to the file server using a file server protocol and receiving an acknowledgement of the commit of the data map from the file server, wherein the file server stores the changed data map;
conveying the changed segments of data to the file server and receiving an acknowledgement of the commit of the changed segments of data; and
signaling to the client making the write requests or other LAN clients that the file has been committed to the file server, wherein the signaling occurs after receiving the acknowledgement of the commit of the data map from the file server, but before receiving an acknowledgement of the commit of the changed segments of data.

8. The hardware-based WAN accelerator of claim 7, wherein the method further comprises providing a second client with the file being written by providing the data map from the file server and the segments of data from a local segment store.

9. The hardware-based WAN accelerator of claim 7, wherein multiple occurrences of a given segment of data in a file is represented by multiple occurrences of the name of the segment of data in the data map associated with the file.

* * * * *